United States Patent [19]
Ono et al.

[11] Patent Number: 5,825,969
[45] Date of Patent: Oct. 20, 1998

[54] INFORMATION MANAGEMENT APPARATUS FOR INHIBITING REPRODUCTION IN A VIDEO CASSETTE RECORDER

[75] Inventors: Hiroaki Ono, Fujisawa; Kiyoshi Kano, Yokohama; Hideo Nishijima, Katsuta; Takao Arai, Yokohama; Takaharu Noguchi, Yokohama; Nobutaka Amada, Yokohama; Hiroo Okamoto, Yokohama; Hitoaki Owashi, Yokohama; Keizo Nishimura, Yokohama; Nobuyuki Kaku, Oiso-machi; Shinya Fujimori, Yokohama, all of Japan

[73] Assignee: Hitachi, Ltd., Tokyo, Japan

[21] Appl. No.: 928,628

[22] Filed: Sep. 12, 1997

Related U.S. Application Data

[63] Continuation of Ser. No. 391,554, Feb. 21, 1995, abandoned.

[30] Foreign Application Priority Data

| Feb. 18, 1994 | [JP] | Japan | 6-020865 |
| Feb. 18, 1994 | [JP] | Japan | 6-020868 |
| Mar. 4, 1994 | [JP] | Japan | 6-034402 |
| Oct. 28, 1994 | [JP] | Japan | 6-265612 |

[51] Int. Cl.$^6$ .......................... H04N 5/92; G11B 15/087
[52] U.S. Cl. .................. 386/94; 360/60; 360/69
[58] Field of Search ..................... 386/94, 46; 360/15

[56] References Cited

U.S. PATENT DOCUMENTS

| 4,475,222 | 10/1984 | Egendorf | 360/132 X |
| 4,628,359 | 12/1986 | Okada et al. | 360/27 X |
| 4,740,890 | 4/1988 | William | 395/186 |
| 5,023,741 | 6/1991 | Conti et al. | 360/132 |
| 5,477,276 | 12/1995 | Oguro | 348/595 |
| 5,535,275 | 7/1996 | Sugisaki et al. | 380/10 |
| 5,577,735 | 11/1996 | Reed et al. | 463/40 |

FOREIGN PATENT DOCUMENTS 61-288582  12/1986  Japan.

Primary Examiner—Aristotelis M. Psitos
Assistant Examiner—James L. Habermehl
Attorney, Agent, or Firm—Antonelli, Terry, Stout & Kraus, LLP

[57] ABSTRACT

The present invention relates to an information providing system. More particularly, this invention relates to an information management apparatus capable of reliable management of distributed information and an information providing system employing the same information management apparatus. The information management apparatus comprises a main information reproducing means for reproducing main information recorded in a given recording medium; and a reproduction management means for managing the main information reproducing means for reproducing the main information. The present invention provides a receiving means provided with a means for recording distributed information and control information limiting the number of main information reproducing cycles on a recording medium, and a main information reproducing means provided with a reproduction disabling means for limiting the reproduction of main information.

17 Claims, 20 Drawing Sheets

RECORDING TAPE PATTERN

TAPE PATTERN IN REPRODUCING MODE

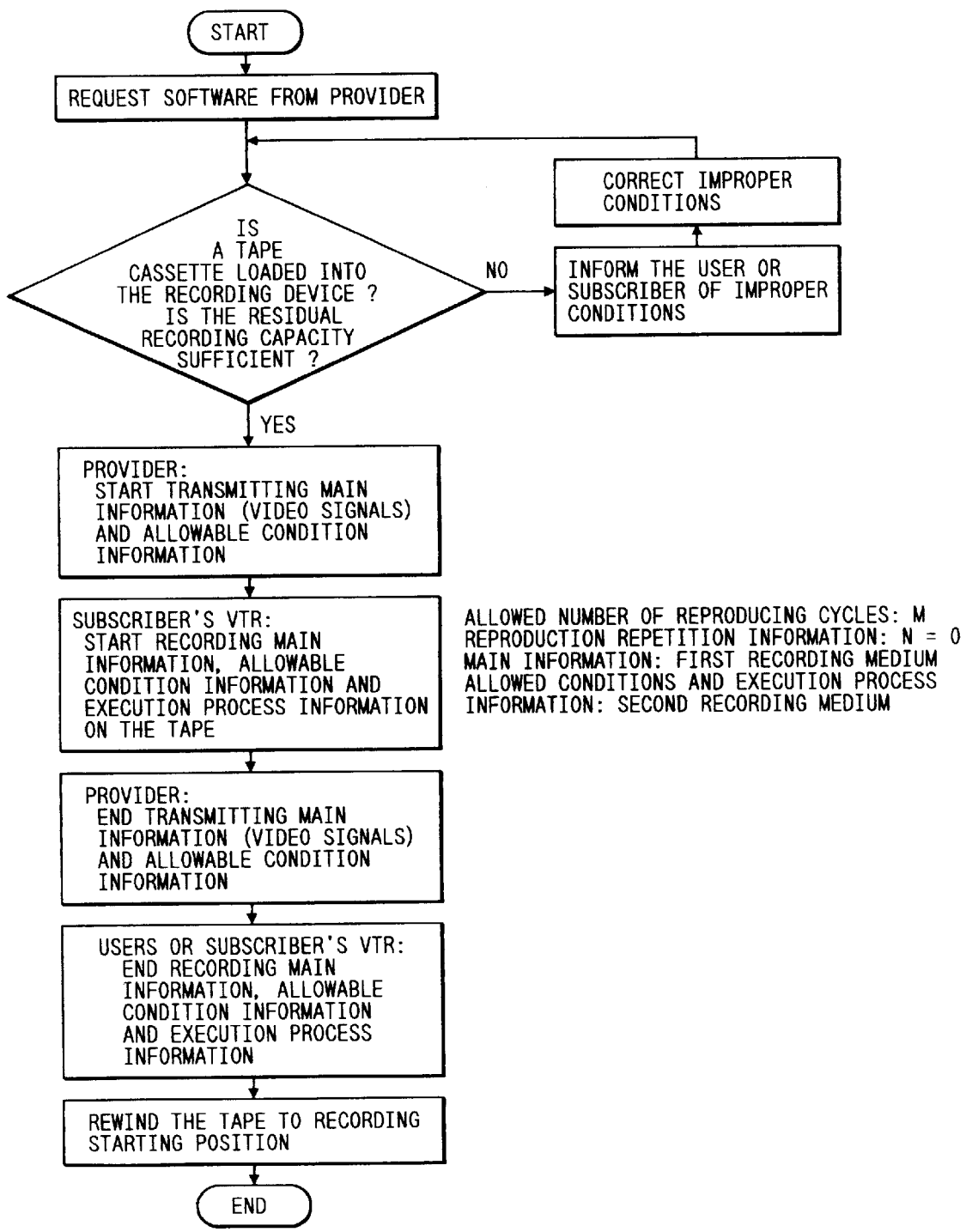

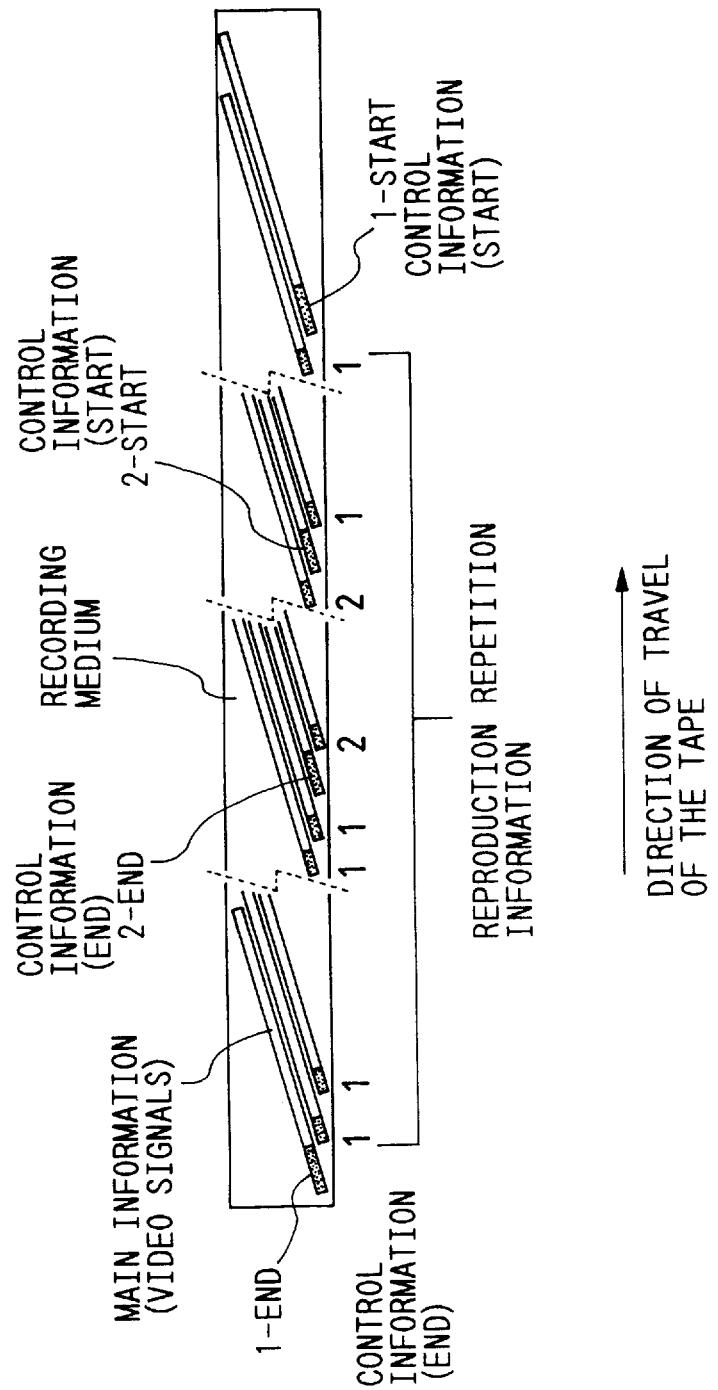

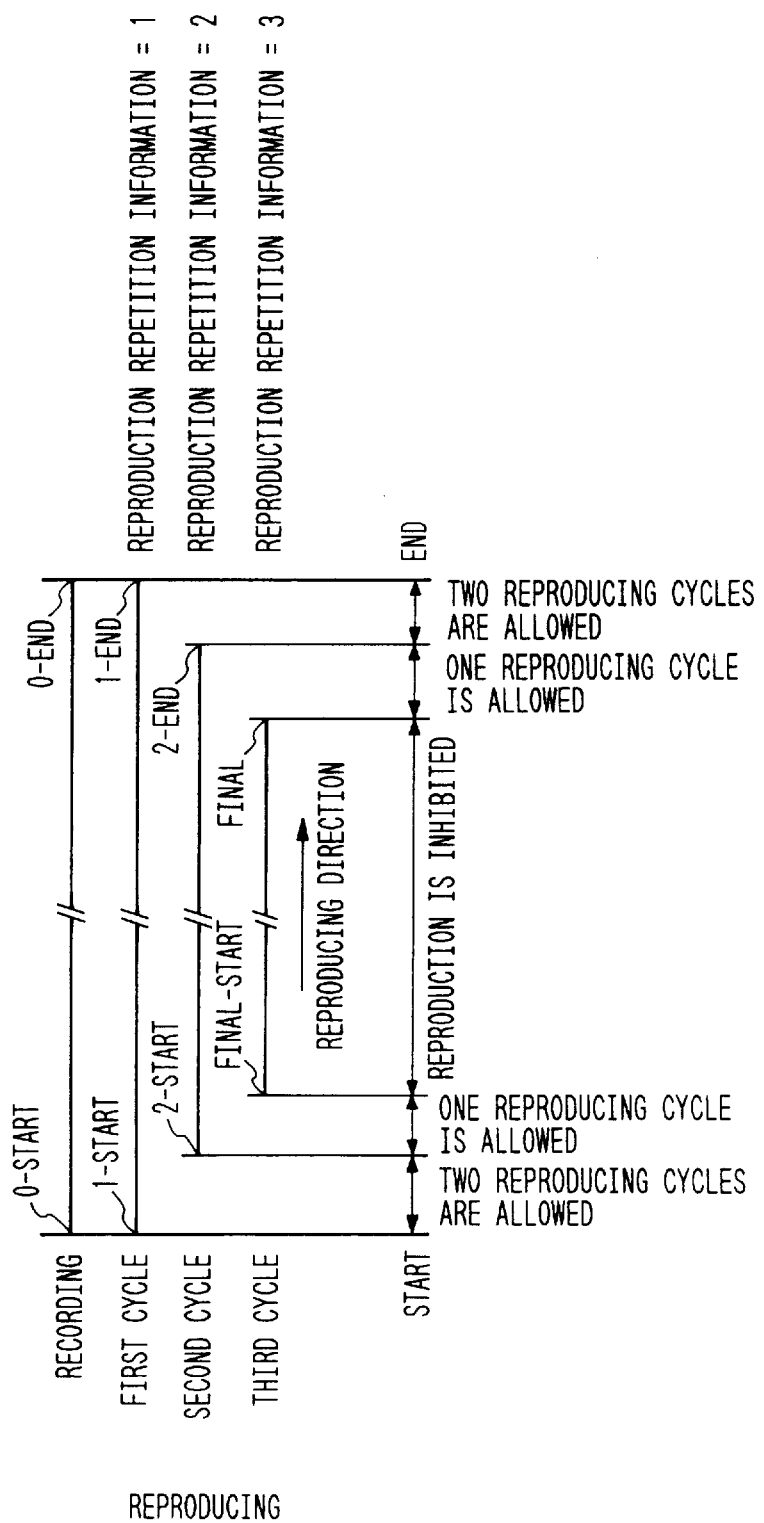

INFORMATION MANAGEMENT APPARATUS FOR INHIBITING REPRODUCTION IN A VIDEO CASSETTE RECORDER

This application is a continuation of application Ser. No. 08/391,554 filed on Feb. 21, 1995 now abandoned.

BACKGROUND OF THE INVENTION

The present invention relates to an information providing system. More particularly, the present invention relates to an information management apparatus capable of reliable management of distributed information and an information providing system employing the same information management apparatus.

Advanced computerization has promoted the establishment of various information providing systems, such as the Dial Q2 System using telephone lines.

When an information providing system provides copyrighted pieces of information, such as musical works or motion pictures, the reliability of management of the copyrights of the information is one of the important factors that determine the economical feasibility of the information providing system. Particularly, when the information providing system provides information represented by digital signals, the importance of the reliability of copyright management is even more significant because digital signals can be copied without entailing significant signal degradation. A method of inhibiting the copying of information, as disclosed in Japanese Patent Laid-open (Kokai) No. 1-288582, mixes false signals for causing the automatic gain control system of VTRs to malfunction into the digital signals representing the information to degrade the quality of pictures copied on recording tapes.

On the other hand, in a country where cable television broadcasting systems are widespread, such as the U.S.A., it is possible to develop information providing systems that provide digital signals representing information desired by subscribers, such as video software, and to use the cable television broadcasting systems as information transfer means. Newly released films are particularly high-valued matters of video software. When providing such highvalued matters of video software, it is essential to establish a highly intelligent information management system which is capable of limiting the number of reproducing cycles, as well as inhibiting copying. The aforesaid known method of inhibiting copying information is incapable of dealing with limiting the number of reproducing cycles.

SUMMARY OF THE INVENTION

It is an object of the present invention to provide an information management apparatus capable of solving the problems in the prior art and of surely imposing restrictions on distributed information reproducing operations and the number of cycles of reproduction of distributed information, and an information providing system employing the same information management apparatus.

With the foregoing object in view, the present invention provides a receiver provided with a recorder for recording distributed information and control information while limiting the number of main information reproducing cycles on a recording medium, and a main information receiver provided with a reproduction disabling unit for limiting the reproduction of main information.

The present invention employs the following features:

A means for recording, as control information, allowable condition information representing allowable conditions for the reproduction of main information distributed by the information provider.

A means for recording as control information execution process information representing the process of operations of means for reproducing the main information.

A disable control means that compares allowable condition information and execution process information, and actuates reproduction disabling means according to the result of comparison, the disable control means being provided in the main information reproducing means.

A means for recording as control information, accounting information for charging for the reproduction of the main information by the main information reproducing means.

A means for recording control information near a position where an operation for recording the main information in the recording medium and/or an operation for reproducing the main information is started and/or terminated.

A means for recording control information in a recording medium storing the main information or in a second recording medium formed integrally with the recording medium storing the main information.

A means for recording and reproducing the control information with the reproducing head of the main information reproducing means.

The present invention also employs the following features for limiting the number of cycles of reproduction:

A reproduction disabling means disables the main information reproducing operation of the main information reproducing means for reproducing a portion of the main information which has already been reproduced, or disables the main information reproducing operation after the main information has been reproduced once or after the main information has been reproduced an allowable number of times.

A detecting means for detecting the number of executed reproducing cycles and actuating reproduction disabling means upon an increase of the detected number of executed reproducing cycles to a given number of reproducing cycles, the detecting means being provided in the reproduction disabling means.

A decision means for deciding whether or not the operation of the reproduction disabling means is normal, and inhibiting the reproduction of information when the operation of the reproduction disabling means is abnormal, the decision means being provided in the reproduction disabling means.

The reproduction disabling means inhibits the backward reproduction of the main information by the main information reproducing means.

The recording medium is capable of being detachably loaded into the main information reproducing means, and, once the recording medium is removed from the main information reproducing means, while the main information is being reproduced, the restart of the reproduction of the main information is refused when the recording medium is loaded again into the main information reproducing means.

The reproduction disabling means is provided with a main information degrading means for degrading or erasing at least a portion of the main information or with a main information erasing means.

A degrading or erasing head is disposed after the reproducing head, as the main information degrading means or the main information erasing means.

The control information comprises allowable condition information representing allowable conditions for main information reproduction, and execution process information representing the process of execution of main information reproduction to impose restrictions on the number of reproducing cycles to be carried out by receiving means and the like according to the control information. The control information is recorded on the recording medium and the number of reproducing cycles is limited according to the contents of the control information. When reproducing the main information, new reproducing cycle information is recorded as the execution process information to have an accurate grasp of the number of reproducing cycles carried out by the receiving means.

The control information is recorded on the recording medium near a position where an operation for recording the main information and/or an operation for reproducing the main information is started and/or terminated to enable the reproduction of the control information immediately at the start of the next reproducing cycle to have an accurate grasp of the reproducing conditions and the number of reproducing cycles.

The control information is recorded on the recording medium for storing the main information or on a second recording medium formed integrally with the recording medium for storing the main information. When recording the control information on a second recording medium, measures are taken to prevent confusion of the main information stored in the recording medium with control information stored in the second recording medium.

A reproducing apparatus or a recording/reproducing apparatus for reproducing the main information disables the reproduction of the information recorded on an information recording medium after the information has been reproduced or after the number of executed reproducing cycles reaches an allowable number of reproducing cycles.

The reproduction disabling means erases at least a portion of the signals recorded on the information recording medium or rewrites at least a portion of the signals with another signal.

The decision means of the reproduction disabling means actuates the reproduction disabling means upon detection of an abnormal operation of the reproduction disabling means.

The decision means of the reproduction disabling means records an operation confirmation signal before the signals recorded on the information recording medium, searches for the operation confirmation signal in the next reproducing cycle, and decides that the reproduction disabling means is abnormal when the operation confirmation signal is found.

When the information recording/reproducing apparatus is a helical scanning VTR, the reproduction disabling means (erasing head) erases a track adjacent a track scanned with the recording/reproducing head.

In a reproducing apparatus or a recording/reproducing apparatus for time division data, the reproduction disabling means erases the time division data after reproduction or in the next time division data reproducing cycle.

The reproducing apparatus or the recording/reproducing apparatus for the information receives information to be recorded and allowable number of reproducing cycles information through a communication line. The above and other objects, features and advantages of this invention will be apparent from the following description of preferred embodiments thereof, taken in conjunction with the drawings.

BRIEF DESCRIPTION OF THE DRAWINGS

FIGS. 1(a) and 1(b) are block diagrams of video software providing systems incorporating the present invention, in which FIG. 1(a) shows a recording system and FIG. 1(b) shows a reproducing system.

FIGS. 2(a) and 2(b) are views showing a tape format to be used by an embodiment of the present invention, while

FIG. 3 is a flow chart of a recording method to be carried out by an embodiment of the present invention.

FIGS. 4(a) and 4(b) are a view showing a tape format to be used by another embodiment of the present invention and a timing diagram related to the tape reproducing operation, respectively.

DESCRIPTION OF THE PREFERRED EMBODIMENTS

A preferred embodiment of the present invention will be described hereinafter with reference to the drawings.

Figure 1A:
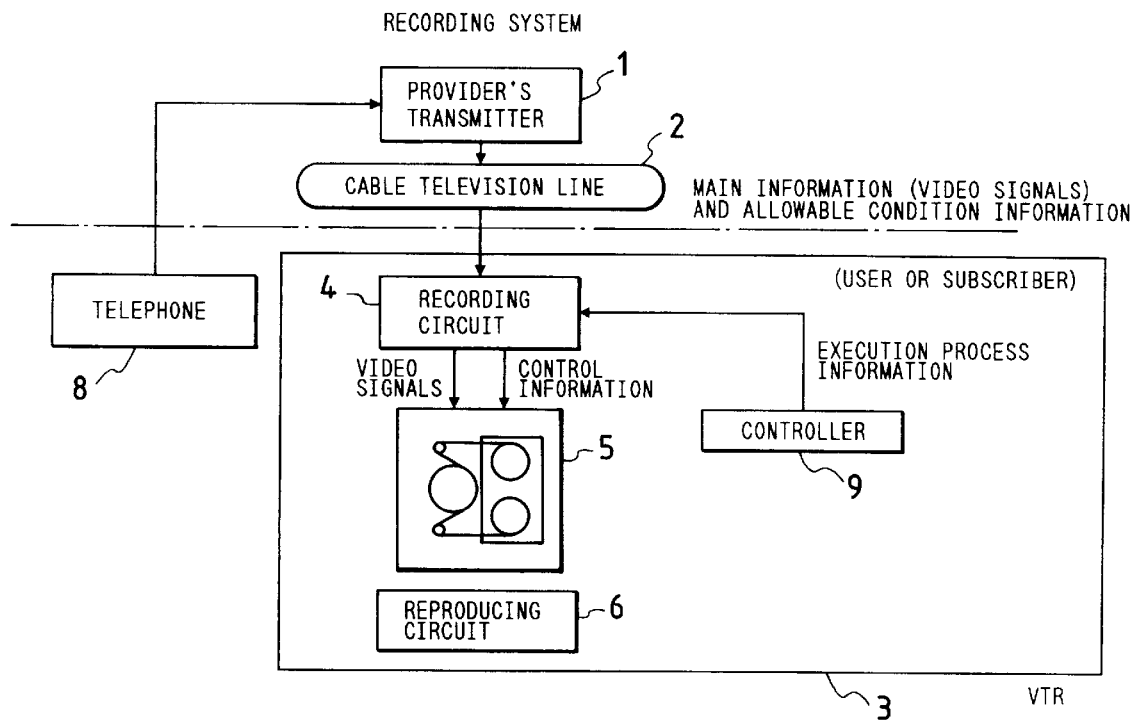
Figure 1B:
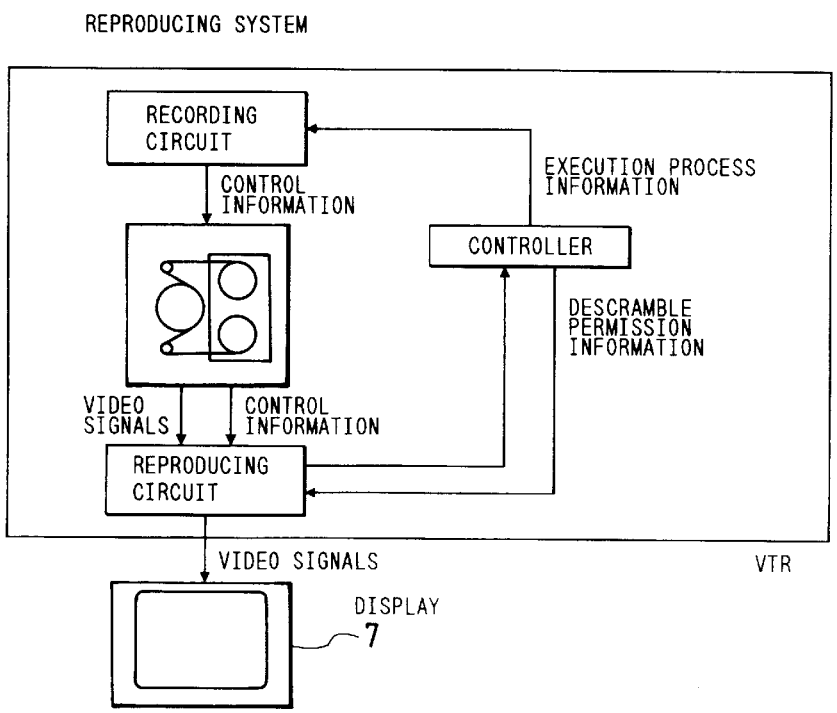

FIG. 1(a) and 1(b) are block diagrams of an information providing system employing an information recording apparatus, such as a VOD (video-on-demand) system, for providing on-demand pay-per-view video software, incorporating the present invention. The information providing system comprises, as basic components, a transmitter 1 of a video software provider, i.e., a transmitting means, a domestic helical scanning VTR 3, i.e., a receiving means, and a cable television line 2, i.e., a transfer means. A tape cassette 5, the recording medium of a recording means, is loaded into the domestic VTR 3.

In this embodiment, video signals, i.e., main information, allowable condition information for restricting the recording and/or the reproduction of the main information or representing allowable conditions for reproduction, i.e., reproduction management means for managing the reproduction of the main information, and control information, such as execution process information representing the process of execution of main information reproduction, are stored on the recording tape contained in the tape cassette 5.

The subscriber sends a request by telephone 8 to the provider to send video software. The subscriber dials the provider and enters the code number of a selected matter of video software by operating the key of the telephone 8. Then, the subscriber is informed of a charge calculated on the basis of a time period which extends from the start of provision of the piece of video software until its end and the time limit from the request to the delivery (urgent delivery is expensive), and the request is completed upon the subscriber's approval of the charge. The charge is collected periodically at future times by direct billing or is drawn from a bank account specified by the subscriber. Since the requesting method in this embodiment uses the telephone 8, the push buttons of the telephone 8 can be effectively used for entering the information.

Another requesting method uses the cable television line 2 serving as the transfer means and enters information by operating the keys of the VTR or a remote controller for controlling the VTR. The use of a single cable television line for both requesting the piece of video software from the provider and providing the piece of video software by the provider in a two-way transmission mode enables more efficient use of the line.

Upon the reception of the request, the provider examines subscriber's condition through the cable television line to see whether or not the tape cassette 5 is loaded into the subscriber's VTR 3 and whether or not the tape cassette 5 has a residual recording capacity sufficient for recording the requested piece of video software. Whether or not the tape cassette 5 is loaded into the VTR 3 can be determined from the condition of a push switch, provided on the VTR 3, which is operated by the tape cassette 5. The residual recording capacity of the tape cassette 5 is estimated by moving the tape at a given speed and detecting the rotating speed of the reel. The estimated residual recording capacity is compared with the capacity of the requested piece of video software. This information is transmitted through the cable television line. If even one of the conditions required of the VTR 3 is not satisfied, a message is sent to that effect through a telephone line or the cable television line to the subscriber, and the start of requested video software transmission is suspended until all the required conditions are satisfied in order that information can be surely provided.

Whether or not the tape cassette 5 is loaded into the VTR 3 and whether or not the residual recording capacity of the tape cassette is sufficient may be determined, for example, by a built-in controller 9 of the subscriber's VTR 3.

When the tape cassette 5 is loaded into the VTR 3 and has a sufficient residual recording capacity, the transmission of digital signals representing the specified piece of video software by a transmitter is started and the digital signals are transmitted through the cable television line 2. Although the digital signals may be transmitted in a normal state for a given time from the start of requested video software transmission, generally, the digital signals are scrambled to avoid unauthorized access to and the reproduction of the digital signals. Therefore, control information for descrambling the digital signals is indispensable to the normal reproduction of the digital signals. The nonscrambled digital signals and which are transmitted in the initial given time and can be reproduced by the subscriber facilitate the confirmation of the contents of the cassette.

Allowable condition information about allowable conditions for reproduction is transmitted together with the video signals representing the piece of video software, i.e., the main information. The allowable condition information and the video signals applied to a recording circuit 4 included in the subscriber's VTR 3 are separated, the allowable condition information is recorded as control information together with execution process information provided by the subscriber's VTR at a given position on the tape. The control information includes allowable condition information representing an allowable condition for reproducing the main information, such as code number information assigned to the subscriber's VTR, key code information for descrambling, and information including an allowable number of reproducing cycles provided by the transmitter, and execution process information provided by the controller 9 of the subscriber's VTR and representing the process of execution of reproduction of the main information, such as recording starting position information, recording terminating position information and reproduction repetition information representing the number of executed reproducing cycles.

When the piece of video software is reproduced, both the main information (video signals) and the control information reproduced from the tape are supplied to a reproducing circuit 6. The reproducing circuit 6 separates the control information, including the execution process information, from the main information and applies the same to the controller 9. The controller reads the number of executed reproducing cycles from the input information, compares the number of executed reproducing cycles with the allowable number of reproducing cycles provided by the transmitting device 1, and sends descramble permission information to the reproducing circuit 6 when the number of executed reproducing cycles is smaller than the allowable number of reproducing cycles. Then, the reproducing circuit 6 descrambles the video signal, converts the digital signals into corresponding analog signals, and then sends the analog signals to a display 7. Meanwhile, the controller 9 supplies reproduction repetition information representing the number of executed reproducing cycles to a recording circuit, and then the recording circuit records the new reproduction repetition information, and position information representing a reproduction starting position and a reproduction terminating position on the tape. If the number of executed reproducing cycles is equal to or greater than the allowable number of reproducing cycles provided by the transmitter, then only scrambled main information is displayed on the display.

Figure 2A:
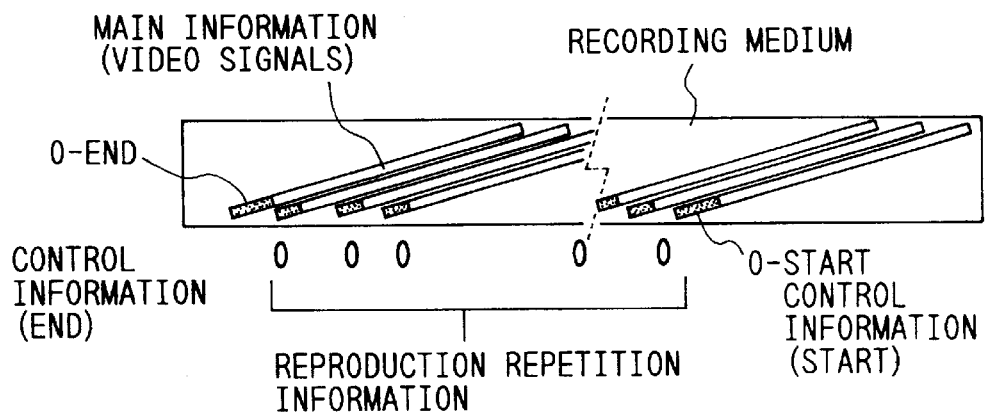

A recording method will be described hereinafter with reference to FIG. 2(a) showing a recording pattern. The main information transmitted by the transmitter, the allowable condition information transmitted by a control signal transmitter, and the execution process information provided by the controller are recorded on the tape in a pattern as shown in FIG. 2(a). The control information, i.e., recording start control information O-start, including the allowable condition information, including the code number information representing the code number of the subscriber's VTR, the key code information for descrambling, and the information representing the allowable number of reproducing cycles provided by the transmitter, and execution process information indicating a video soft recording start position, is recorded at the first position in the pattern. The execution process information indicating the number of reproducing cycles is recorded at a given position on each video track (at the head of the track in FIG. 2(a)) independently of or in combination with the main information (video signals). Control information, i.e., recording termination control information O-end, including the execution process information representing a terminating position, and the allowable condition information, including the code number information representing the code number of the subscriber's VTR, the key code information for descrambling, and the information representing the allowable number of reproducing cycles provided by the transmitter, is recorded at a position where the video is terminated, and then transmission is terminated. Then, the VTR stops after rewinding the tape to the recording starting position. The recording method is illustrated by a flow chart shown in FIG. 3.

Figure 2B:
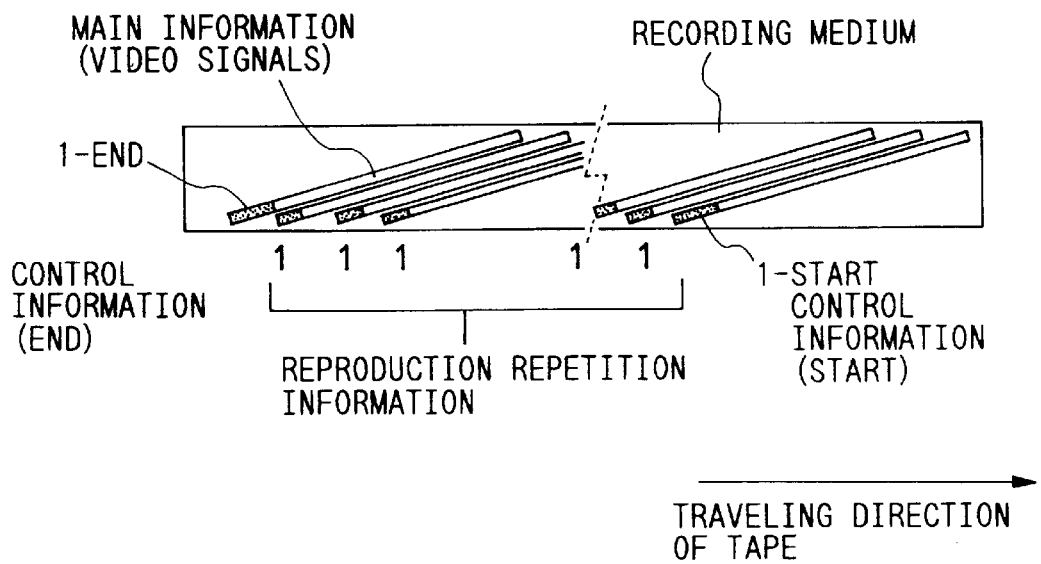
Figure 2C:
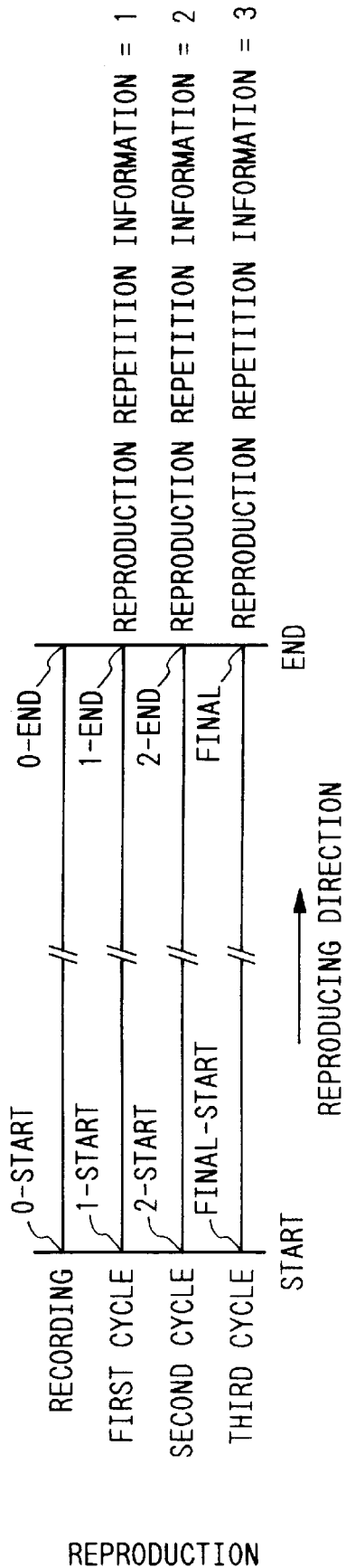
FIG. 2(c) is a timing diagram related to the tape reproducing operation.

FIG. 2(b) shows a reproducing method and a reproduced pattern in accordance with the present invention. As shown in FIGS. 2(b) and 2(c), when reproducing the piece of video software, the recording start control information O-start is read, and the video signals are descrambled according to the key code information only when the code number of the subscriber's VTR provided by the transmitter coincides with a code number previously registered on the VTR. Control information 1-start, including the execution process information, such as the position information indicating a first reproducing cycle starting position, and the allowable condition information, including the code number information representing the code number of the subscriber's VTR, the key code information for descrambling, and the information representing the allowable number of reproducing cycles provided by the transmitter, is recorded in a replace mode. The subscriber's VTR is provided with a control information recording head for recording the control information start so as to record the control information 1-start immediately after the reproducing head has reproduced the video signals or after several tracks have been reproduced. The descrambled video signals are reproduced from video tracks and are applied to the display. When reproducing the video signals, reproduction repetition information=1 indicating the first reproducing cycle is recorded on the pattern. The reproduction repetition information may be recorded by the control information recording head. Control information 1-end including execution process information, including position information indicating a first reproducing cycle terminating position, and the allowable condition information, including the code number information representing the code number of the subscriber's VTR, the key code information for descrambling, and the information representing the allowable number of reproducing cycles provided by the transmitter, is recorded at the end of the reproducing operation, and then the first reproducing cycle is terminated. The tape may be rewound immediately after the termination of the reproducing cycle, but the tape need not necessarily be rewound. When the tape is rewound immediately after the termination of the reproducing cycle, the VTR stops after the tape has been rewound so that a position where the control information 1-start is recorded corresponds to the control information recording head. When the tape is not rewound, the VTR stops with the tape in a state where the position where the control information 1-end is recorded corresponds to the control information recording head. When the second reproducing cycle is started with the tape in a state where the position where the control information 1-start is recorded corresponds to the control information recording head, the control information 1-start is read. the video signals are descrambled according to the key code information only when the code number of the subscriber's VTR transmitted by the transmitting device coincides with the code number registered beforehand on the VTR. Control information 2-start including execution process information, including position information indicating a second reproducing cycle starting position, and the allowable condition information including the code number information representing the code number of the subscriber's VTR, the key code information for descrambling, and the information representing the allowable number of reproducing cycles provided by the transmitter is recorded in a replace mode. The control information 2-start may be recorded with the control information recording head. The descrambled video signals are applied to the display, and reproduction repetition information=2 indicating the second reproducing cycle is recorded on the pattern. At the end of the video software, control information 2-end including execution process information, including position information indicating a second reproducing cycle terminating position, and the allowable condition information, including the code number information representing the code number of the subscriber's VTR, the key code information for descrambling, and the information representing the allowable number of reproducing cycles provided by the transmitter, is recorded, and then the second reproducing cycle is terminated. If the tape is stopped in a state where the position where the control information 1-end is recorded corresponds to the control information recording head and the VTR is operated for rewinding, the tape is rewound after the code number information indicating the code number of the subscriber's VTR, the key code for descrambling, and the information indicating the allowable number of reproducing cycles transmitted by the transmitting device have been read. After the tape has been rewound so that the position where the control information 1-start is recorded corresponds to the control information recording head, the video signals are descrambled. Control information for final-start, including execution process information such as position information indicating a third reproducing cycle starting position, and allowable condition information, including the code number information indicating the code number of the subscriber's VTR, the key code information for descrambling and the information indicating the allowable number of reproducing cycles transmitted by the transmitter, is recorded in a replace mode. Although FIGS.

2(a) and 2(c) illustrate a procedure for three reproducing cycles, the procedure is repeated for the allowable number of reproducing cycles transmitted by the transmitting device. After the reproducing cycle has been repeated the allowable number of times, the video signals are not descrambled and only the scrambled video signals are applied to the display. In some cases, the recording tracks are not positioned at the starting position or the ending position due to slack in the tape or the like when the tape cassette is removed from the VTR to load another tape cassette into the VTR and the former tape cassette is loaded again into the VTR. Therefore, the VTR has a function to search the tracks for the starting position or the ending position for several seconds. This method disables the reproduction of the video signals by other VTRs having code numbers different from the code number of the subscriber's VTR. Since other VTRs are unable to find the starting position or the ending position, other VTRS are unable to rewind the tape. Accordingly, the subscriber is able to reproduce the video signals and rewind the tape only using the registered VTR, and thereby highly reliable copyright protection can be secured.

Figure 6:
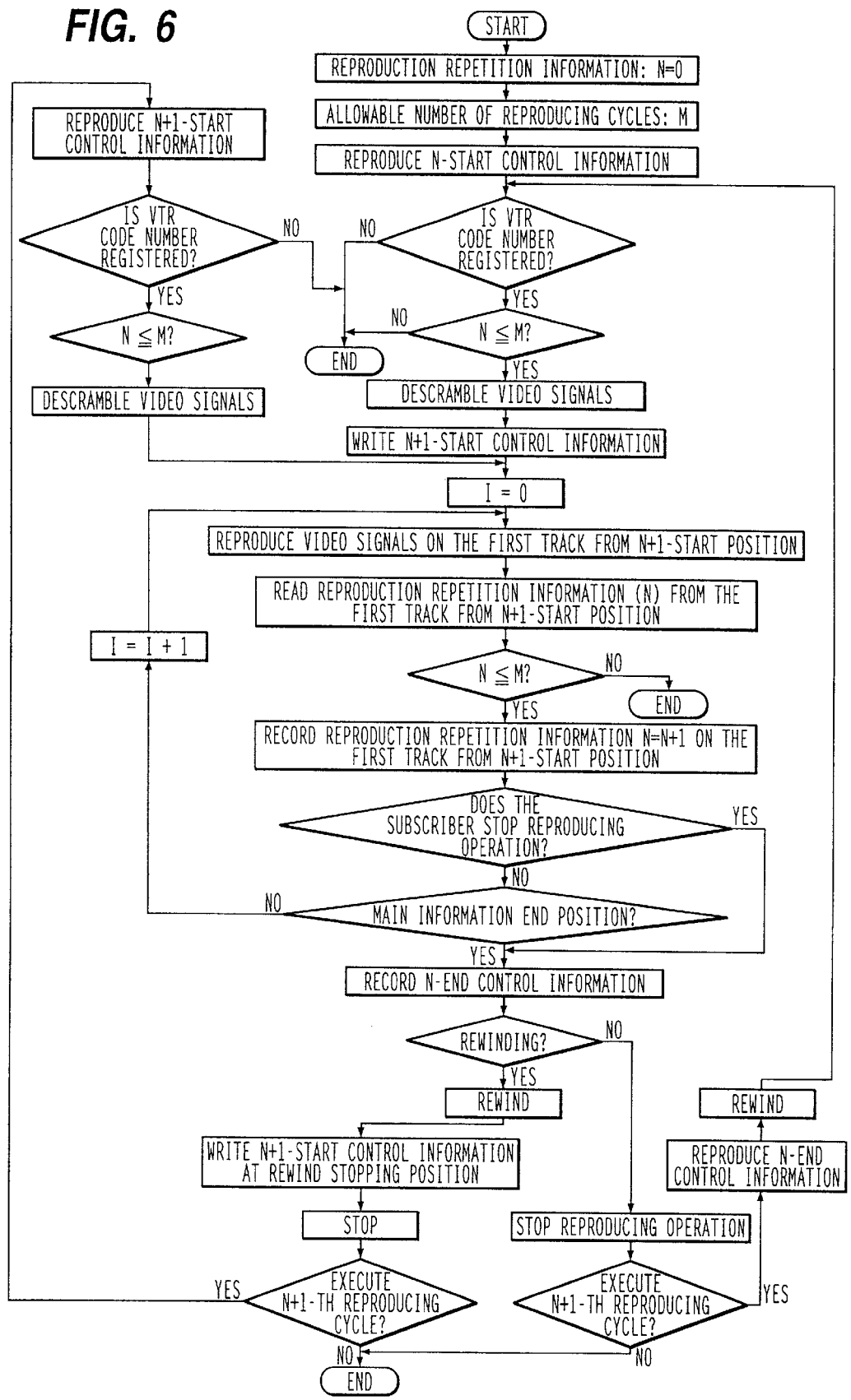
FIG. 6 is a flow chart of a reproducing method to be carried out by an embodiment of the present invention.

Operation when the tape is stopped or fed for fast feed during a reproducing cycle or when the tape is rewound will be described with reference to FIGS. 4(a) and 4(b) on an assumption that the allowable number of reproducing cycles is three, which is not limitative. FIGS. 4(a) and 4(b) illustrate a case where the first reproducing cycle was completed normally and the tape was not rewound to the starting position of the first reproducing cycle for the second reproducing cycle, the second reproducing cycle was started from a halfway position, and the second reproducing cycle was interrupted. Since the first reproducing cycle was completed normally, the control information 1-start is recorded at the starting position, the control information 1-end is recorded at the ending position, and the reproduction repetition information=1 indicating the execution of the first reproducing cycle is recorded on each track. When the VTR is operated for the second reproducing cycle while the tape is being rewound, first the control information 1-end is read, the control information 2-start indicating the second reproducing cycle starting position is recorded at a halfway position on the tape, and then the reproducing operation is started. The reproduction repetition information=2 indicating the second reproducing cycle is recorded on each track during the reproducing operation. When the reproducing operation is interrupted, the control information 2-end indicating a second reproducing cycle ending position is recorded at a position corresponding to the control information recording head when the tape is stopped, and then the VTR stops. If the VTR is operated in the same manner during the third reproducing cycle, the control information final-start is recorded at a position corresponding to the control information recording head when the reproducing operation is started, the reproduction repetition information=3 is recorded on each track, and the control signal final-end is recorded at a position corresponding to the control information recording head when the tape is stopped. When it is desired to reproduce a portion of the video signals which has been reproduced less than three times, the tape is rewound so that the starting point of the portion of the video signals corresponds to the control information recording head, and then the VTR is operated for reproducing operation. In this case, the tape is rewound after the control information final-end has been recorded at the ending position. If the reproduction repetition information recorded at a position corresponding to the control information recording head when the tape is rewound is less than three, control information including reproduction repetition information indicating a number obtained by adding one to the recorded number of reproducing cycles is recorded at the same position, and then the reproducing operation is started. Reproduction repetition information indicating a number equal to that indicated by the control information recorded at the starting position is recorded on each track. If control information indicating a number equal to or greater than the number of reproducing cycles is read during the reproducing operation, starting position control information indicating a number obtained by adding one to the number of reproducing cycles is recorded in a replace mode when the reproduction repetition information indicates a number less than three, and the reproducing operation is continued. When the control information final-start is read, descrambling is restricted and the scrambled video signal is applied to the display. In some cases, a reproducing operation is performed to confirm a position on the tape during a rewinding operation and then the rewinding operation is resumed immediately. In such a case, the starting control information and the ending control information are recorded all over the tape if the start control information is recorded immediately at the reproduction starting position. Therefore, the starting signal may be recorded after the reproducing operation has been continued for a given time, and nonscrambled video signals may be reproduced for a given time. FIG. 6 is a flow chart showing steps of the foregoing reproducing method.

Although the reproducing method has been described on an assumption that the repetition of the reproducing cycle is limited to a plurality of times, information allowed to be reproduced only once may be scrambled so that the information cannot be reproduced after the information has been reproduced once. However, since the video signals are recorded on the tape contained in the tape cassette, the information providing system enables the subscriber to request only the key code from the provider when the subscriber desires to reproduce the video signals again, and then the provider transfers the key code after the subscriber has accepted another charge. In this case, the time required to transmit the video signals is unnecessary, and the subscriber is able to reproduce the video signals repeatedly in a short time and to save the line charge. In this case, the information providing system reduces the charge according to the increase in the number of repetitions of the reproducing cycle.

Figure 5:
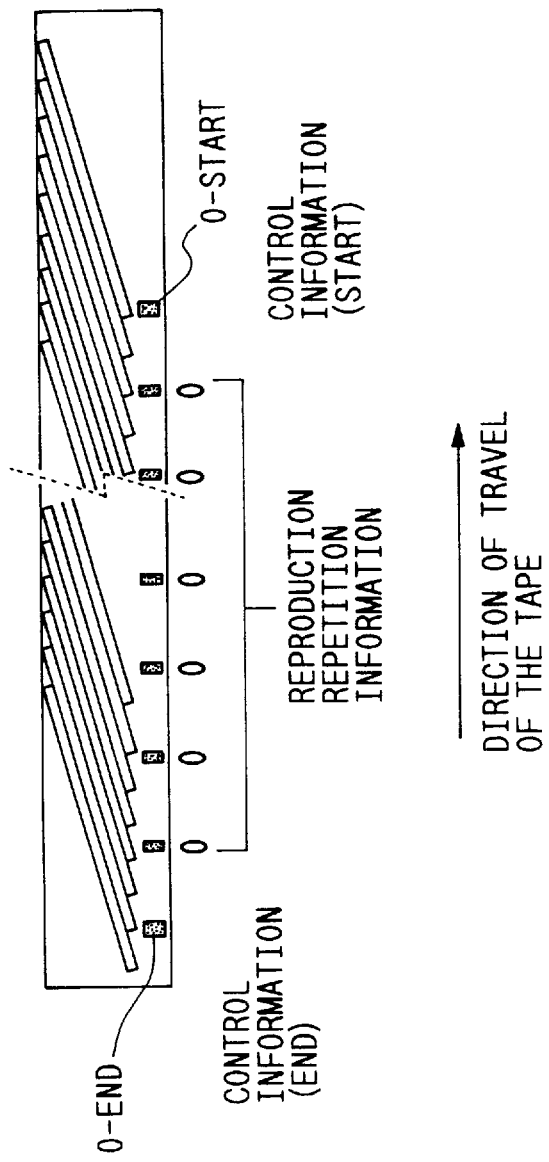
FIG. 5 is a view showing a tape format to be used by another embodiment of the present invention.

Although the control information, as well as the video signals, are recorded on the track pattern with the rotary recording head in this embodiment, the control information indicating the starting position and the ending position or the reproduction repetition information may be recorded, for example, with a fixed recording head, as shown in FIG. 5. It is also possible to record the control information indicating the starting position and the ending position with a rotary recording head and to record the reproduction repetition information with a fixed recording head and vice versa. The reproduction repetition information may be recorded every several tracks or may be recorded on every track. Although the reproduction repetition information is recorded on every track in the cases shown in FIGS. 2 and 3, the reproduction repetition information may be recorded every several tracks. Although the same reproduction repetition information may be recorded on all the tracks in the aforesaid cases, it is also possible to record, for example, address information. Although the control information is recorded in the upper part and the lower part of the tape pattern in the cases shown in FIGS. 2, 3 and 4, the control information may be recorded at any position on the tape pattern.

Although the video signals and the control information are recorded on the same recording medium in this embodiment, the video signals and the control information may be recorded on separate recording media, respectively. A second embodiment of the present invention will be described hereinafter with reference to FIG. 7.

Figure 7:
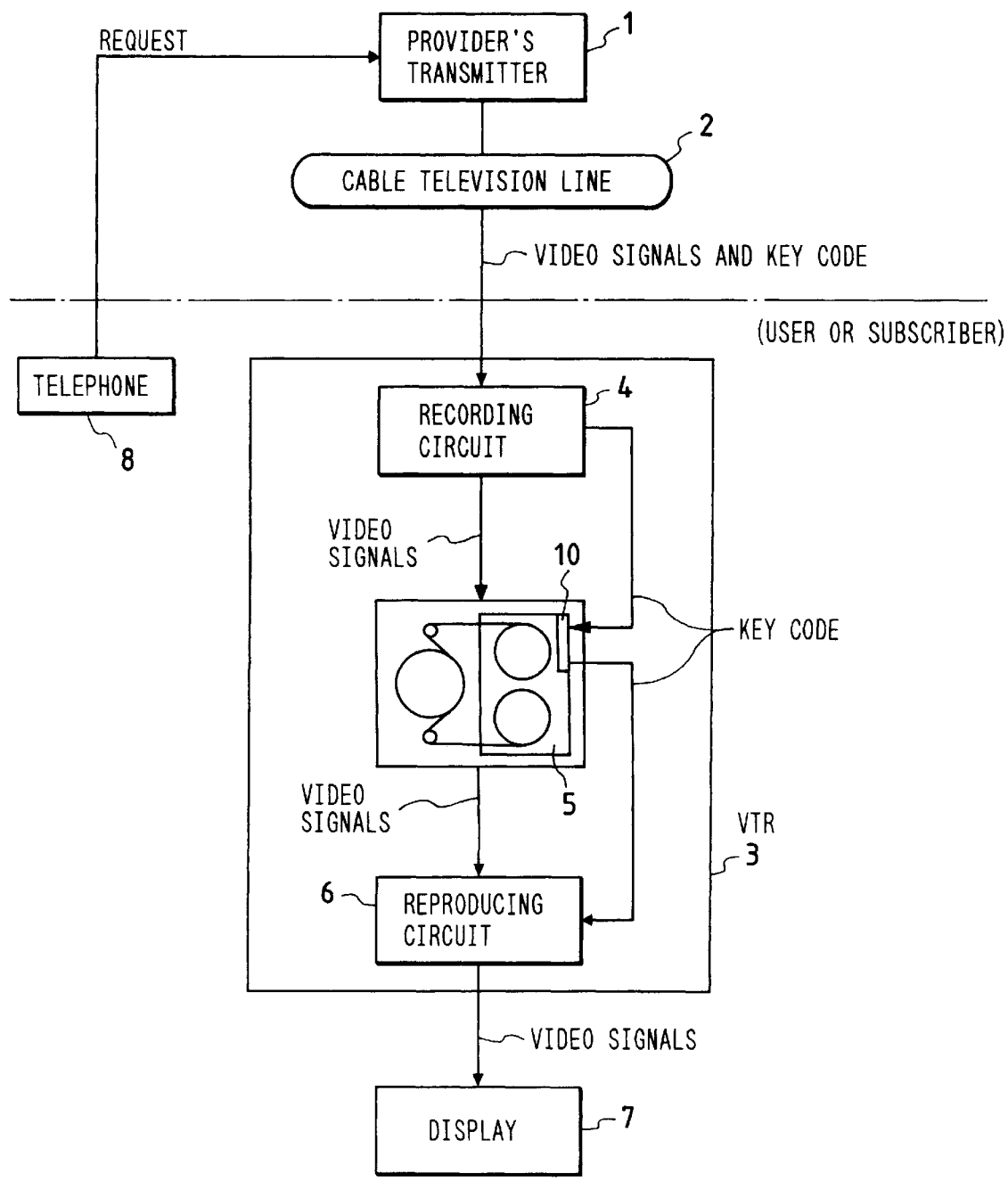
FIG. 7 is a block diagram of a video software providing system according to the present invention.

FIG. 7 is a block diagram of a video software providing system incorporating the second embodiment of the present invention. The video software providing system comprises, as basic components, a provider's transmitter 1, i.e., a transmission means, a domestic helical scanning VTR 3, i.e., a receiving means, and a cable television line 2, i.e., a transfer means. A tape cassette S, i.e., a recording medium serving as a first recording means, is loaded into the domestic VTR 3, i.e., the receiving means. The tape cassette 5 is provided with an IC memory 10, i.e., a recording medium serving as a second recording means, on its case. The terminals of the IC memory 10 are connected to the relevant circuit of the VTR 3.

Since the tape cassette 5, i.e., a first recording means, is provided integrally with the IC memory 10, i.e, a second recording means, pieces of control information recorded in the second recording means of a different tape cassette will not be confused with each other.

Video signals representing a piece of video software and control information transmitted by the transmitting device are applied to a recording circuit 4 of the subscriber's VTR 3, the video signals and the control information are separated, the video signals are recorded on the tape of the tape cassette 5, and the control information is recorded in the IC memory 10 mounted on the case of the tape cassette 5. Address signals are recorded at a recording starting position and a recording ending position on the tape to facilitate the recognition of a recording range. The tape can be rewound selectively to a recording starting position by operating a changeover switch included in the VTR 3, so that the head of the tape can be quickly located at the recording starting position.

When reproducing the piece of video software, the video signals are read from the tape and the control information is read from the IC memory 10, the video signals and the control information are supplied to a reproducing circuit 6, and the reproducing circuit 6 descrambles the video signals and the control information to obtain digital signals, converts the digital signals into corresponding analog signals and sends the analog signals to a display 7.

A tape rewinding key included in the control information is not accepted for a recording section in which scrambled signals are recorded to limit the repetition of the reproducing operation to an allowable number of reproducing cycles, for example, one reproducing cycle, transmitted by the transmitting device. A stop key included in the control information can be accepted to enable the subscriber to be absent during the reproducing operation. The reproduction of the residual video signals may be disabled once the tape cassette 5 is ejected from the subscriber's VTR to inhibit rewinding the tape of the tape cassette 5 by VTRs other than the subscriber's VTR. The number of reading cycles for reading the control information from the IC memory 10 is counted automatically every time the control information is read from the IC memory 10 and the control information stored in the IC memory 10 is erased upon the increase of the number of reading cycles beyond an allowable number of reading cycles to limit the repetitions of the reproducing cycle.

Although the control information is erased, the video signals are held on the tape of the tape cassette. Therefore, when the subscriber desires to reproduce the video signals again, the subscriber needs to request only the control information, including a key code and such, from the video software provider and to accept an additional charge. Then, the video software provider transmits the control information to the subscriber's VTR. In this case, the time necessary for receiving the video signals is unnecessary, the video signals can be reproduced repeatedly in a short time and the subscriber is able to save the line charge. The video software providing system reduces the charge according to the increase of the number of repetitions of the reproducing cycle for some pieces of video software.

The video software providing system allows the subscriber to choose an accounting system that accepts advance payment. When the subscriber approves the payment of a charge for a desired number of reproducing cycles when requesting a piece of video software from the video software provider, control information representing a prepaid charge is transmitted through the cable television line to the IC memory 10 and the prepaid charge is recorded on the IC memory 10. A predetermined charge is subtracted from the prepaid charge every time the key code is read from the IC memory 10. The control information is not erased and is held on the IC memory 10 while the residual prepaid charge is greater than a charge for further reproducing cycles, and hence a request for the control information need not be repeated. The balance of the prepaid charge can be displayed for confirmation on the display 7 by giving an instruction to the display 7 by operating the VTR 3 or a remote controller for controlling the VTR 3.

In FIG. 7, when sending the video signals from the reproducing circuit to the display, false signals for causing the automatic gain control system of the VTR 3 to malfunction are mixed in the video signals to disable copying the video signals by degrading the quality of pictures reproduced from copy tapes, so that the video signals cannot be copied.

Although this embodiment uses a tape cassette as a recording medium and a VTR as a recorder, the tape cassette and the VTR may be replaced by any kind of recording medium and a recorder suitable for using the recording medium, such as a disk and a disk recorder, or a semiconductor memory and an I/O unit.

The video software providing system in this embodiment limits only the number of reproducing cycles and retains the piece of video software on the recording medium. Therefore, the video software providing system is not perfectly safe to inhibit the unfair use of the piece of video software. A method capable of surely erasing the information simultaneously with a reproducing operation or after the reproducing cycle has been repeated a predetermined number of times will be explained with reference to FIGS. 8 to 11.

Figure 8:
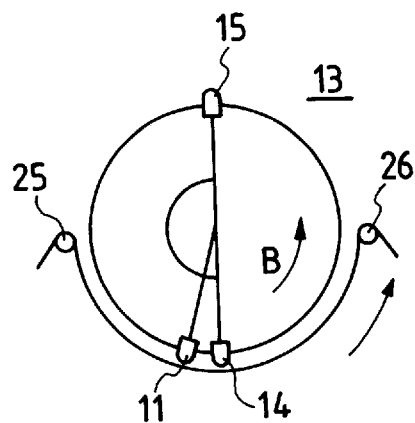
FIG. 8 is a typical plan view of a rotary drum unit included in a recording/reproducing apparatus employed in an embodiment of the present invention.

FIG. 8 shows a rotary drum unit 13 for a reproducing system or a recording/reproducing system, provided with a first head 14 and a second head 15 for recording or reproducing signals. The heads 14 and 15 are disposed diametrically opposite to each other. Indicated at 11 is a third head. A tape 18 is guided by guides 25 and 26 so as to be wrapped around the rotary drum unit 13 and travels in the direction of the arrow A. The rotary drum unit 13 rotates in the direction of the arrow B.

Figure 9:
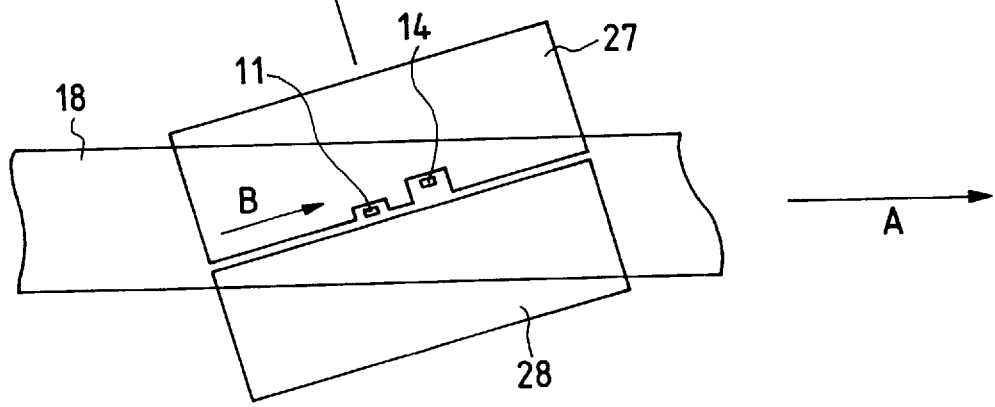
FIG. 9 is a schematic side view of a rotary drum unit included in a recording/reproducing apparatus employed in an embodiment of the present invention.
Figure 10:
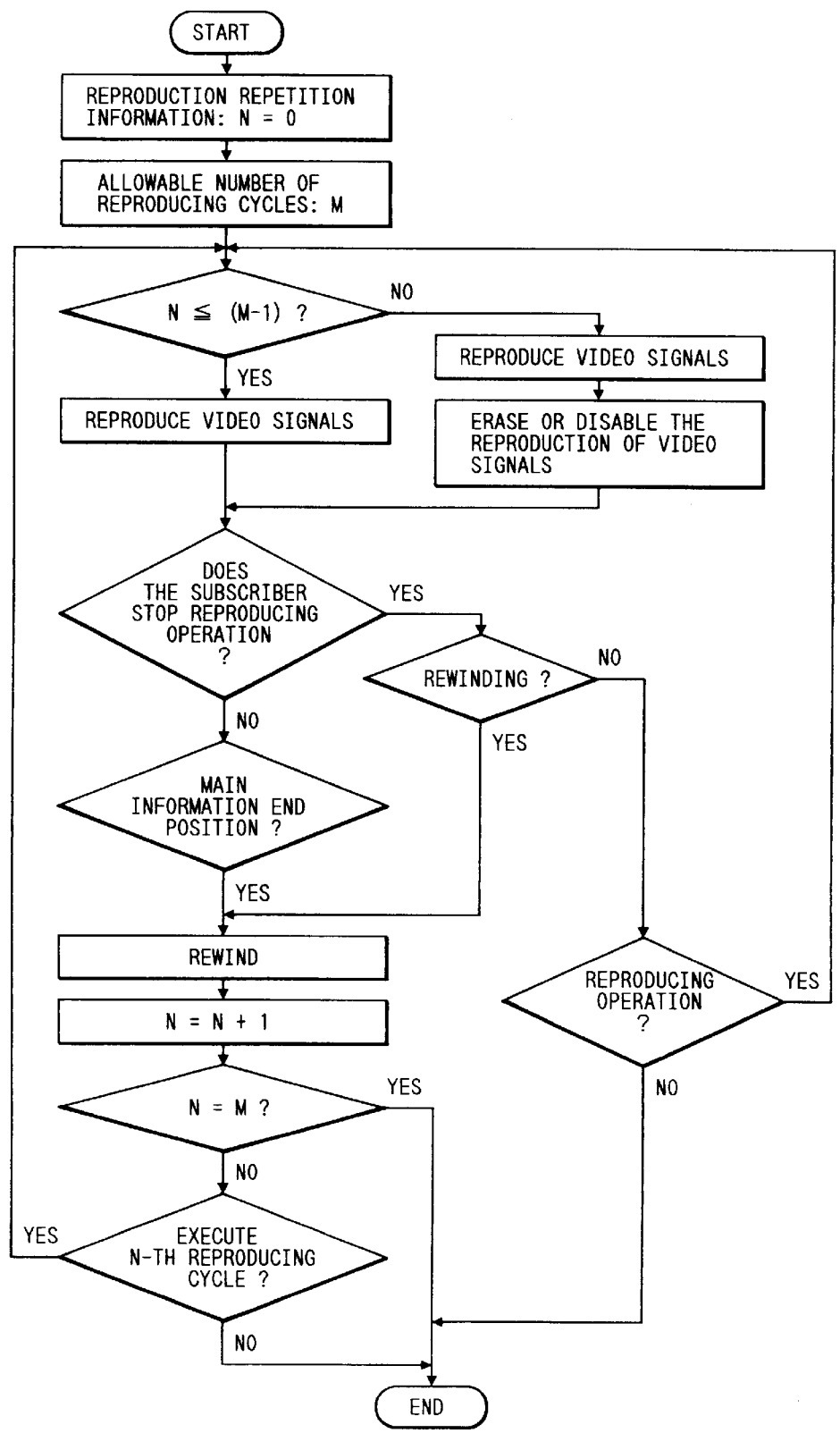
FIG. 10 is a flow chart of a reproducing method to be carried out by a further embodiment of the present invention.

FIG. 9 is a side view of the rotary drum unit 13. The rotary drum unit 13 comprises a rotary drum 27 and a stationary drum 28. As shown in FIG. 8, the head 14, i.e., a recording/reproducing head, and the head 15, not shown in FIG. 9, are disposed diametrically opposite to each other. The tape 18 is guided by the guides 25 and 26 so as to be wrapped helically around the rotary drum unit 13 and travels in the direction of the arrow A. When the rotary drum 27 rotates, the heads 14 and 11 scan the tape 18 in the direction of the arrow B.

Figure 11:
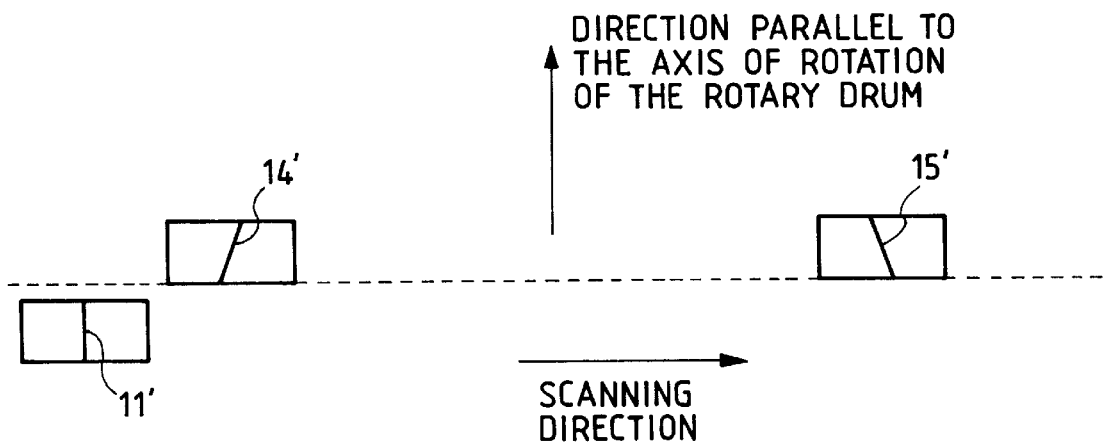
FIG. 11 is a diagram for use in explaining the respective heights of the heads of a rotary drum unit included in a recording/reproducing apparatus employed in an embodiment of the present invention.

FIG. 11 shows the respective heights of the head gaps of the heads mounted on the rotary drum 27 with respect to a direction parallel to the axis of rotation of the rotary drum 27. The respective head gaps of the heads 14 and 15 with respect to the direction parallel to the axis of rotation of the rotary drum 27 are equal to each other. The upper end of the head gap of the head 11 is on a level equal to or below the level of the lower ends of the head gaps of the heads 14 and 15.

Figure 12:
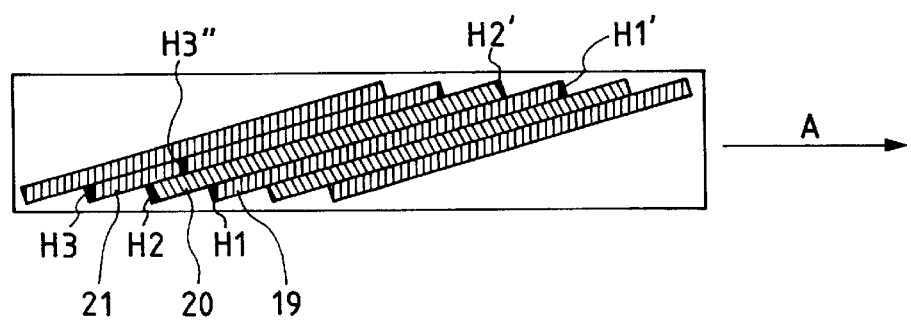
FIG. 12 is a typical view of tracks on a tape to be used by an embodiment of the present invention.

FIG. 12 shows signals recorded on the tape 18 and being reproduced with the heads 14 and 15. The heads 14 and 15 may be used for recording. The tape 18 travels in the direction of the arrow A. First, the head 14 scans a track 19 from a position H1 to a position H1'. Simultaneously with, immediately before or after the separation of the head 14 from the tape 18 after arriving at the position H1', the head 15 starts scanning a track 20 contiguous with the track 19 from the position H2. Simultaneously with, immediately before or after the separation of the head 15 from the tape 18 after arriving at a position H2', the head 14 starts scanning a track 21 adjacent to the track 20 from a position H3. Thus, the heads 14 and 15 scan successive tracks to reproduce signals recorded on the tracks.

When the head 14, which has started scanning the track 21 from the position H3, arrives at a position H3", the head 11 starts scanning the track 20, which had been scanned by the head 15 and from which signals had been reproduced before the head 14 started scanning the track 21 from the position H3, from the position H2. If the head 11 creates a magnetic field that erases the signals recorded on the track 20, the signals recorded on the track 20 are erased by the head 11. If the head 11 writes signals different from those recorded on the track 20, the signals recorded on the track 20 are replaced with the signals written by the head 11. The heads 11, 14 and 15 scan the tracks successively in such a sequence that the head 11 will be able to erase or to disable the reproduction of the signals recorded on the tracks which have been scanned by the head 15. The arrangement of the head may be the same as that of the control information recording head that records the reproduction repetition information and the execution process information. The control information recording head may be used as an erasing head when reproduction repetition control is not performed or after the number of reproducing cycles has reached the allowable number of reproducing cycles. If the gap width 11' of the head 11 shown in FIG. 11 is increased downward so that the gap width of the head 11 is twice the gap width 14' or 15' of the heads 14 or 15 or greater, the head 11 is able to erase or to disable the reproduction of the signals recorded on the tracks which have been scanned by the head 14 as well as the signals recorded on the tracks which have been scanned by the head 15. Although the head 11 erases or rewrites all the signals on each of the tracks scanned by the head 11 in this embodiment, the head 11 may erase a portion of the signals on each of the tracks, for example, 30% or above, 50% or above, 80% or above, preferably, 90% or above of the signals on each of the tracks. A signal to erase or to disable the reproduction, of the signals recorded on the tracks may be supplied to the head 11 to erase or to disable the reproduction of the signals immediately after the signals have been reproduced. When it is permitted to reproduce the signals a given number of times, for example M times, a signal to erase or to disable the reproduction of the signals recorded on the tracks is applied to the head 11 in the N-th (N=M−1) reproducing cycle.

The tape cassette and the VTR employed in this embodiment as a recording medium and a recording device may be replaced by any other suitable recording medium and any other suitable recorder, such as a disk and a disc recorder, or a semiconductor memory and an I/O unit. When a disk recorder is employed, the disk recorder is provided with a first head or a first pickup, and a second head, and a signal to erase signals recorded on the tracks is supplied to the second head trailing the first head to erase the signals after the same have been reproduced with the first head. The second head may write signals different from the signals recorded on the tracks in a replace mode.

A second embodiment of the present invention will be described with reference to FIGS. 13 to 16 as applied to a video software providing system, such as a VOD system, and a conventional VTR system, such as a system compatible with a VHS system.

Figure 13:
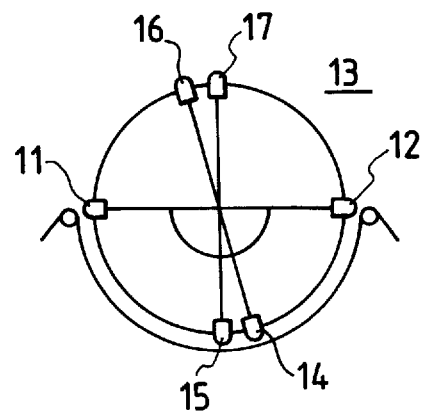
FIG. 13 is a schematic plan view of a rotary drum unit included in a recording/reproducing apparatus to be used in an embodiment of the present invention.

FIG. 13 shows a rotary drum unit 13 provided with heads 14, 15, 16 and 17 for recording or reproducing signals for a VOD system, i.e., a first system, and heads 11 and 12 for recording or reproducing signals for a VHS system, i.e., a second system. The heads 14 and 15 are disposed adjacently, and the heads 16 and 17 are disposed adjacently for simultaneous two-channel recording. The heads 14 and 15 are disposed diametrically opposite to the heads 16 and 17, respectively. The heads 11 and 12 are paired for recording or reproducing signals and are disposed diametrically opposite to each other. A tape 18 is guided by guides 25 and 26 so as to be wrapped around the rotary drum unit 13 as it travels in the direction of the arrow A. The rotary drum unit 13 rotates in the direction of the arrow B.

Figure 14:
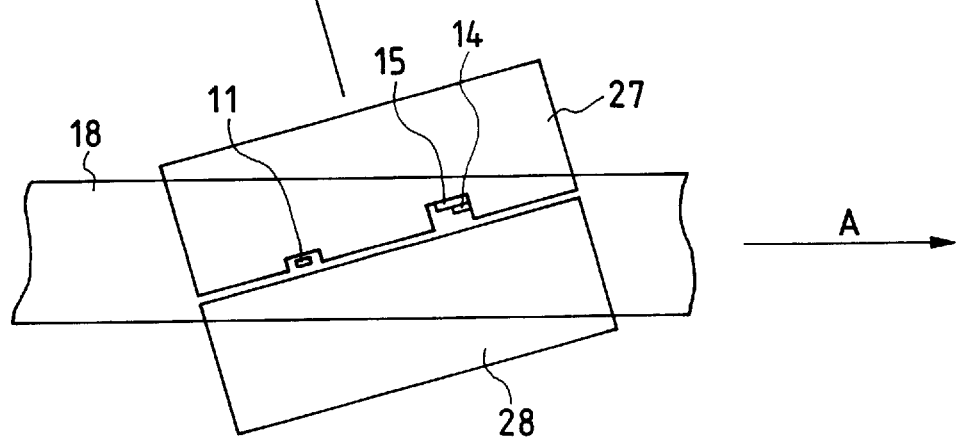
FIG. 14 is a schematic side view of a rotary drum unit included in a recording/reproducing apparatus to be used in an embodiment of the present invention.

FIG. 14 is a side view of the rotary drum unit 13. The rotary drum unit 13 comprises a rotary drum 27 and a stationary drum 28. The heads 14 and 15 are recording/reproducing heads for the VOD system, i.e., the first system. As shown in FIG. 13, the heads 14 and 15 are disposed diametrically opposite to the heads 16 and 17, not shown in FIG. 14, respectively. The head 11 is a recording/reproducing head for the VHS system, i.e., the second system. As shown in FIG. 13, the heads 11 and 12 are disposed diametrically opposite to each other. The tape 18 is guided by the guides 25 and 26 so as to be wrapped helically around the rotary drum unit 13 as it travels in the direction of the arrow A. When the rotary drum 27 rotates, the heads 14, 15 and 11 scan the tape 18 in the direction of the arrow B.

Figure 15:
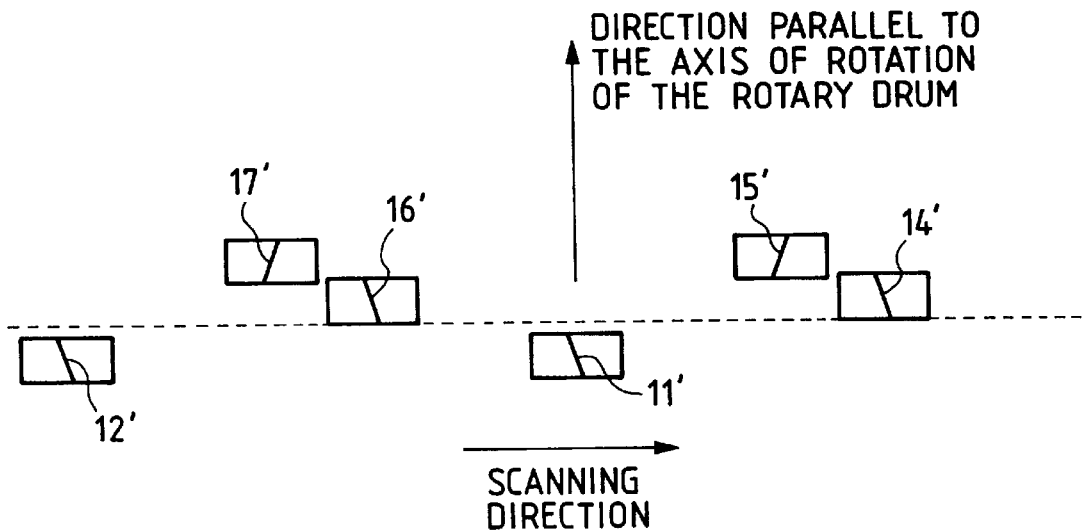
FIG. 15 is a diagram for use in explaining the respective heights of heads of a rotary drum unit included in a recording/reproducing apparatus to be used by an embodiment of the present invention.

FIG. 15 shows the respective heights of the head gaps of the heads mounted on the rotary drum 27 with respect to a direction parallel to the axis of rotation of the rotary drum 27. The respective head gaps of the heads 14 and 15 are on different levels, respectively, with respect to a direction parallel to the axis of rotation of the rotary drum 27. The respective head gaps of the heads 16 and 17 are on different levels, respectively, with respect to a direction parallel to the axis of rotation of the rotary drum 27. The heads 14 and 16 are on the same level, and the heads 15 and 17 are on the same level. The upper ends of the respective head gaps of the heads 11 and 12 are on or below the level of the lower ends of the respective head gaps of the heads 14 and 16.

Figure 16:
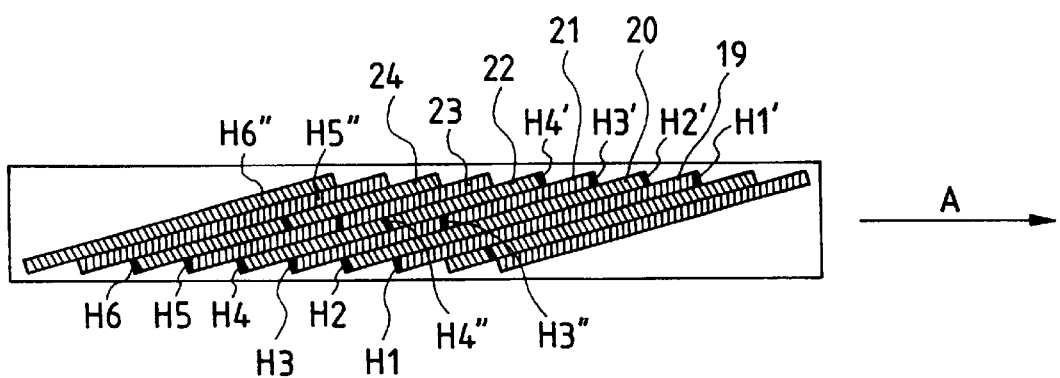
FIG. 16 is a typical view of recording tracks on a tape to be used by an embodiment of the present invention.

FIG. 16 is a view of assistance in explaining the operations of the heads 14, 15, 16 and 17 for reproducing signals of the VOD system recorded on the tape 18. The heads 14, 15, 16 and 17 may be used for recording. The tape 18 travels in the direction of the arrow A. First, the head 14 scans a track 19 from a position H1 to a position H1' and, at the same time, the head 15 scans a track 20 contiguous with the track 19 from a position H2 to a position H2'. Simultaneously with, immediately before or after the separation of the heads 14 and 15 from the tape 18 after arriving respectively at the positions H1' and H2', the head 16 starts scanning a track 21 contiguous with the track 20 from a position H3 and, at the same time, the head 17 starts scanning a track 22 contiguous with the track 21 from a position H4. Simultaneously with or after the separation of the heads 16 and 17 from the tape 18 after arriving respectively at positions H3' and H4', the heads 14 and 15 start scanning a track 23 contiguous with the track 22 from a position H5 and a track 24 from a position H6, respectively. The foregoing series of scanning operations is repeated to reproduce the signals. The signals of the VHS system are reproduced with the heads 11 and 12 using the same reproducing procedure as that carried out by the first embodiment.

Although operation for recording or reproducing the signals of the VHS system is withheld during operation for recording or reproducing the signals of the VOD system, the heads 11 and 12 scan the tape 18. Since the heads 11 and 12 are arranged as illustrated in FIGS. 13 to 15 on the rotary drum 27, for example, the head 12 starts scanning the track 20 from the position H2 upon the arrival of the heads 16 and 17, which started scanning the tracks 21 and 22 from the positions H3 and H4, at positions H3" and H4", respectively. The track 20 has been scanned by the head 15 and the signals recorded on the track 20 have been reproduced before the heads 16 and 17 start scanning the tracks 21 and 22. If the head 12 creates a magnetic field capable of erasing the signals previously recorded on the track 20, the signals previously recorded on the track 20 are erased by the head 12. If the head 12 records on the track 20 signals different from those previously recorded on the track 20 in a replace mode, the signals different from those previously recorded on the track 20 are recorded on the track 20. The head 11 starts scanning the track 22 from the position H4 upon the arrival of the heads 14 and 15, which started scanning the tracks 23 and 24 from the positions H5 and H6, at positions H5" and H6", respectively. The track 22 has been scanned by the head 17 and the signals recorded on the track 22 have been reproduced before the heads 14 and 15 scan the tracks 23 and 24. The head 11, similar to the head 12, erases the signals previously recorded on the track 22 or writes on the track 22 signals different from those previously recorded on the track 22 in a replace mode. The foregoing series of scanning operations is repeated to erase or to disable the reproduction of the signals recorded on the tracks after the signals have been scanned and reproduced with the heads 15 and 17. If the respective gap widths 11' and 12' of the heads 11 and 12 shown in FIG. 15 are increased downward so that the widths 11' and 12' are twice the gap width of the head 14, 15, 16 or 17 or greater, the heads 11 and 12 are able to erase or to disable the reproduction of the signals recorded on the tracks scanned by the heads 14 and 16 as well as the signals recorded on the tracks scanned by the heads 15 and 17. Although the heads 11 and 12 erase or rewrite all the signals recorded on the tracks in this example, the heads 11 and 12 may erase or rewrite a portion of the signals, for example, 30% or above, 50% or above, 80% or above, preferably, 90% or above of the signals.

In the system in this embodiment, which is compatible with two systems, when reproducing signals recorded by the VOD system and, at the same time, erasing or disabling the reproduction of the signals recorded on the tape, the signals are erased or the reproduction of the signals is disabled by the head of the VHS system. Therefore no special head for erasing or disabling the reproduction of the signals is necessary, which reduces the cost of the system. If the head of the VHS system is used for recording the reproduction repetition information and the execution process information, further reduction of the cost is possible.

Although this embodiment employs a tape cassette and a VTR as a recording medium and a recording device, the tape cassette and the VTR may be replaced by any other suitable recording medium and any other suitable recording device, such as a disk and a disk recorder, or a semiconductor memory and an I/O unit. When a disk recorder is employed in a system capable of recording/reproducing operations in two modes, the disk recorder is provided with a first head or a first pickup for a first mode and a second head for a second mode, and the second head is disposed so as to trail the first head during the reproducing operation. When the second head scans tracks which have been scanned by the first head and the second head creates a magnetic field to erase the signals recorded on the tracks, the signals are erased by the second head after being reproduced with the first head. If the second head records on the tracks signals different from those previously recorded on the tracks in a replace mode, the signals different from those previously recorded on the tracks are recorded on the tracks.

Another embodiment that erases signals after the signals have been reproduced will be described hereinafter with reference to FIGS. 17 to 23.

Figure 17:
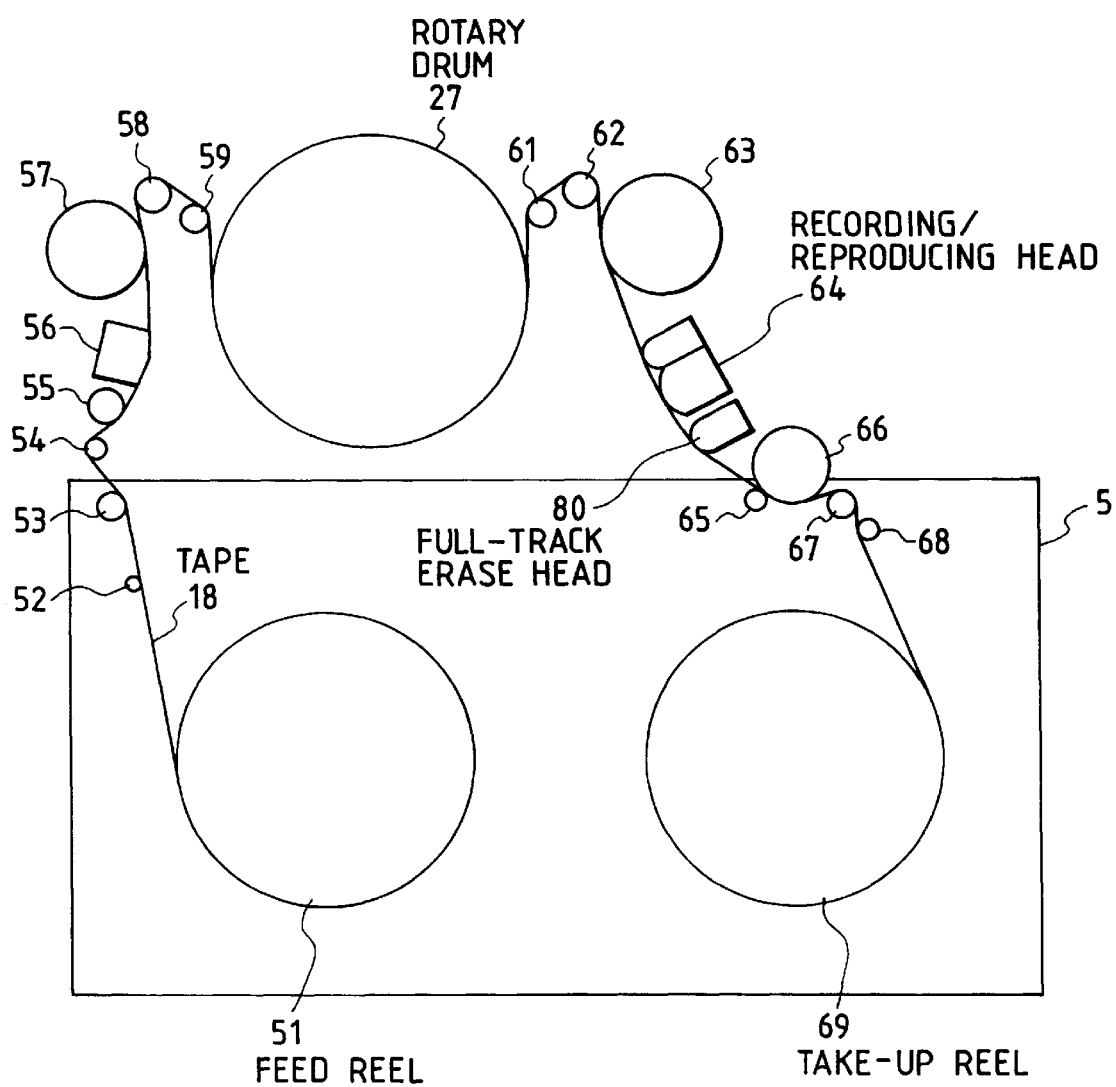
FIG. 17 is a schematic plan view of an information recording apparatus, particularly showing a tape path.

FIG. 17 is a schematic plan view of a VTR 3, showing a tape path. A tape 18 unwound from a feed reel 51 is guided by entrance tape guides 52 to 59 so as to travel around a rotary drum 27, is guided by exit tape guides 61 to 68 to a take-up reel 69 and is taken up on the take-up reel 69. A full-track erase head 80 capable of full-track erasing is disposed near the exit tape guide 65. The full-track erase head 80 is not actuated while the number of executed reproducing cycles is smaller than an allowable number of reproducing cycles included in allowable condition information, so that signals recorded on the tape 18 are retained after the same have been reproduced. During the last reproducing cycle, the full-track erase head 80 is actuated to erase the signals sequentially after the signals have been reproduced to disable a further reproducing cycle.

Since all the signals on the tape are erased by the full-track erase head in this embodiment, a highly reliable disabling operation can be achieved and the repetition of the reproducing cycle can be limited to an allowable number of reproducing cycles. When the system includes a VTR of the VHS system type provided with a fill-track erase head disposed between entrance tape guides, the parts and the driving circuit of the VTR can be used for such a purpose to reduce the cost of the system.

Figure 18A:
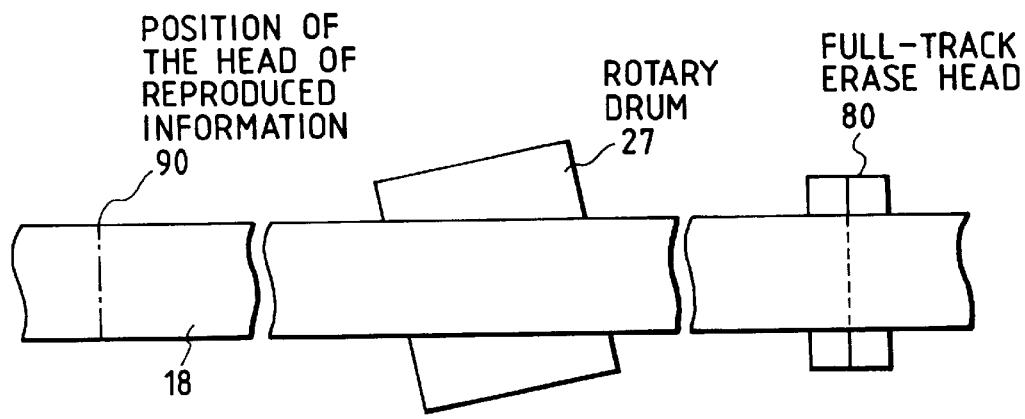
FIGS. 18(a), 18(b) and 18(c) are side views showing a tape path in an information recording apparatus to be used by the present invention.
Figure 18B:
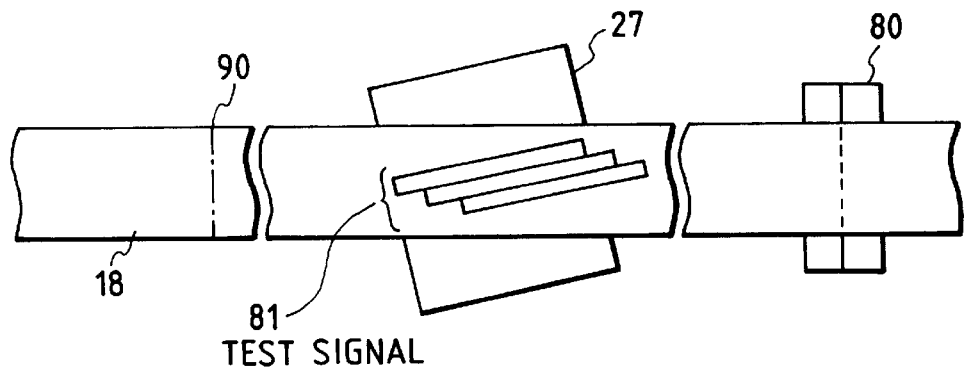
Figure 18C:
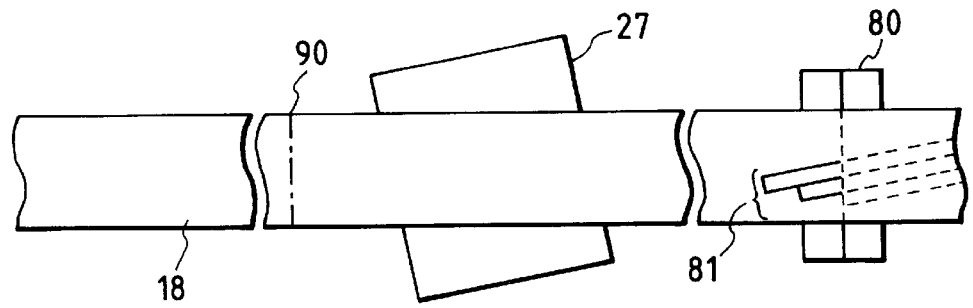

If the full-track erase head 80 malfunctions during the last reproducing cycle or the full-track erase head 80 is modified unjustly so as not to function normally, the signals cannot be erased and the reliability of limiting the repetition of the reproducing cycle to the allowable number of reproducing cycles is reduced. Accordingly, this embodiment is provided with the following decision means for deciding whether the full-track erase head 80 is operating normally or abnormally. Referring to FIGS. 18(a), 18(b) and 18(c), t~he tape 18 is located and reversed up to a position which is before the head 90 of recorded information to be reproduced and is obtained by rewinding a portion corresponding to a test section for testing the operation of the full-track erase head 80, before the last reproducing cycle is started, as shown in FIG. 18(a). After the reels are rotated in the normal direction to feed the tape 18 for reproducing the signals, the head of the rotary drum 27 records a test signal 81 in the test section as shown in FIG. 18(b). As the tape 18 is fed in the normal direction, the test section in which the test signal 81 is recorded arrives at the full-track erase head 80, as shown in FIG. 18(c). If the full-track erase head 80 is in the normal state, the test signal 81 recorded by the head of the rotary drum 27 is erased. After the test section has passed the position corresponding to the full-track erase head 80, the tape 18 is rewound again to the position shown in FIG. 18(a). If the full-track erase head 80 is in the normal state, the test signal 81 is erased and hence the head of the rotary drum 27 does not provide any signal. If the full-track erase head 80 malfunctions, the test signal is not erased and hence the head of the rotary drum 27 provides a signal upon the detection of the test signal 81. Then, it is decided that the full-track erase head 80 is in an abnormal state and the reproduction start command is refused.

Although all the signals are erased in this embodiment, it is also possible to interfere with the reproducing operation by erasing only the signals on part of the width of the tape, depending on the signals processed by the system or the recording format.

Although this embodiment carries out the erasing operation continuously with respect to a time axis for the entire length of the tape, signals only in portions of the length of the tape may be erased; that is, the erasing operation may be executed intermittently, depending on the signals processed by the system and the recording format.

Although this embodiment erases all the recorded signals completely, i.e., at an erasing ratio of about 100%, the recorded signals may be erased at a lower erasing ratio, for example, 50%, depending on the signals processed by the system, provided that the reproduced signals are deteriorated effectively.

Although this embodiment uses an erase head for erasing the recorded signals, signals different from the recorded signals may be recorded in an overwrite mode with, for example, an audio head so that the reproduced signals are deteriorated, depending on the signals processed by the system.

Figure 19:
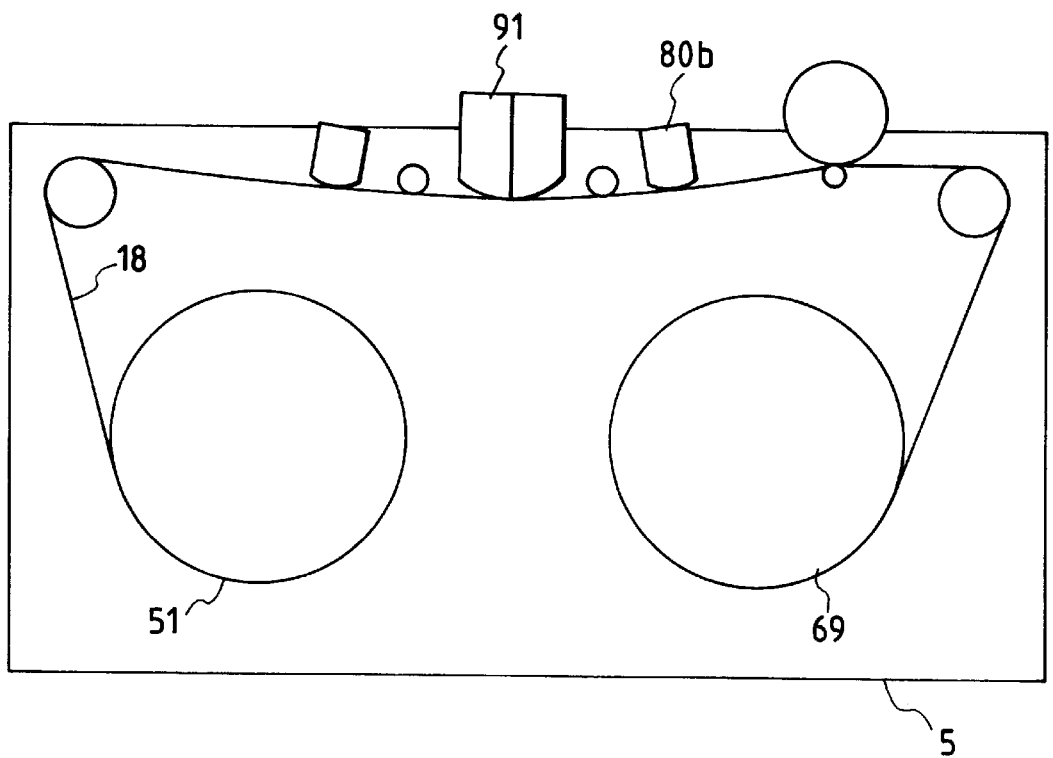
FIG. 19 is a plan view of a stationary head type tape recorder embodying the present invention.

Although this embodiment records signals with a head mounted on a rotary drum in a helical recording mode, signals may be recorded by a tape recorder provided with a stationary head 91 and an erase head 80b, as shown in FIG. 19.

Although this embodiment uses a head exclusively for disabling signal reproduction in addition to the head mounted on the rotary drum 27, signal reproduction can be disabled with a head mounted on the rotary drum 27, which will be described hereinafter.

Figure 20:
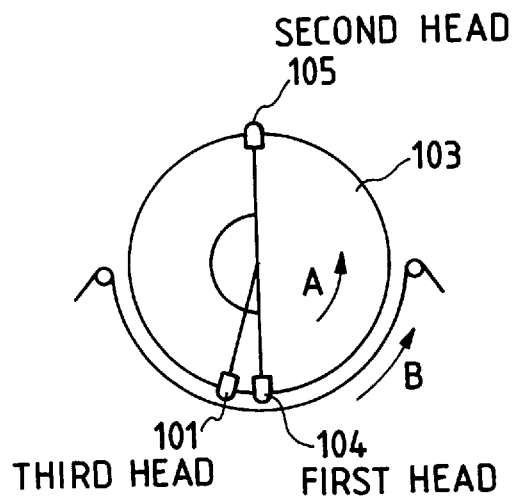
FIG. 20 is a schematic plan view of a rotary drum included in an information recording apparatus to be used by the present invention.

Referring to FIG. 20, a rotary drum 27 is provided with a first head 104 and a second head 105 for signal recording or signal reproducing. The heads 104 and 105 are disposed diametrically opposite to each other. The rotary drum 27 is provided with a third head 101, which is used exclusively for disabling signal reproduction. If the system is provided with an EP head which functions when a VTR of a VHS system operates in an SP mode, the EP head can be used for disabling signal reproduction and the system need not be provided with any head exclusively for disabling signal reproduction. A tape 18 travels in the direction of the arrow B and the rotary drum 27 rotates in the direction of the arrow A.

Figure 21:
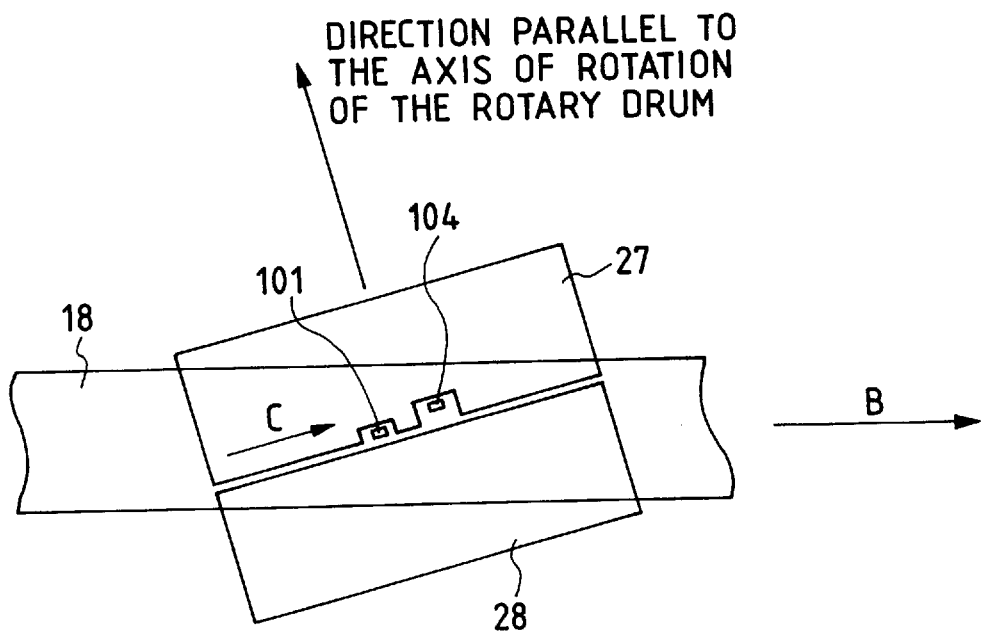
FIG. 21 is a schematic side view of a rotary drum included in an information recording apparatus to be used by the present invention.

FIG. 21 is a side view of the rotary drum 27. The head 104, which is a recording/reproducing head, and the head 105, not shown in FIG. 21, are disposed diametrically opposite to each other, as shown in FIG. 20. The third head 101 is disposed near the first head 104. As shown in FIG. 21, the tape 18 travels in the direction of the arrow B. When the rotary drum 27 rotates, the first head 104 and the third head 101 scan the tape 18 in the direction of the arrow C.

Figure 22:
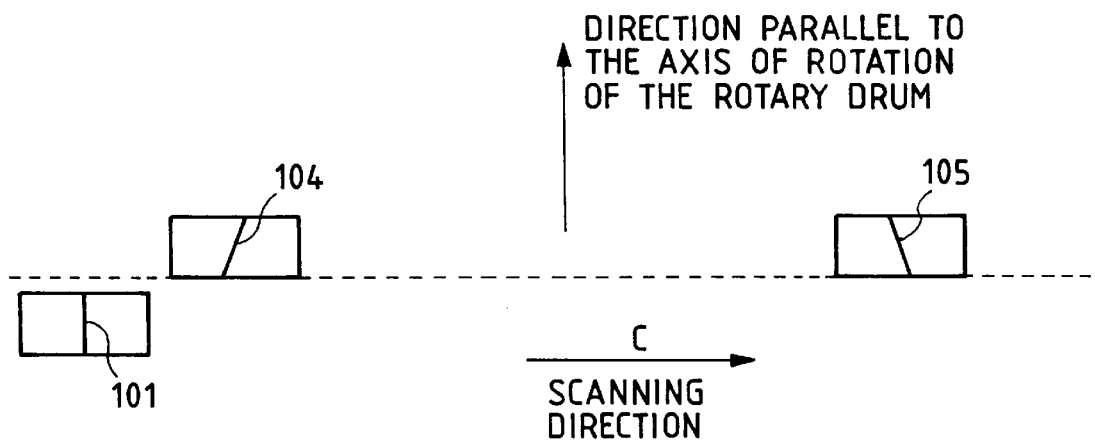
FIG. 22 is a diagram for use in explaining the respective heights of heads of an information recording apparatus to be used by the present invention.

FIG. 22 shows the respective heights of the head gaps of the heads mounted on the rotary drum 27 with respect to a direction parallel to the axis of rotation of the rotary drum 27. The head gaps of the heads 104 and 105 are on the same level with respect to a direction parallel to the axis of rotation of the rotary drum 27. The upper end of the head gap of the third head 101 is on a level equal to or below the level of the lower ends of the head gaps of the heads 104 and 105.

Figure 23:
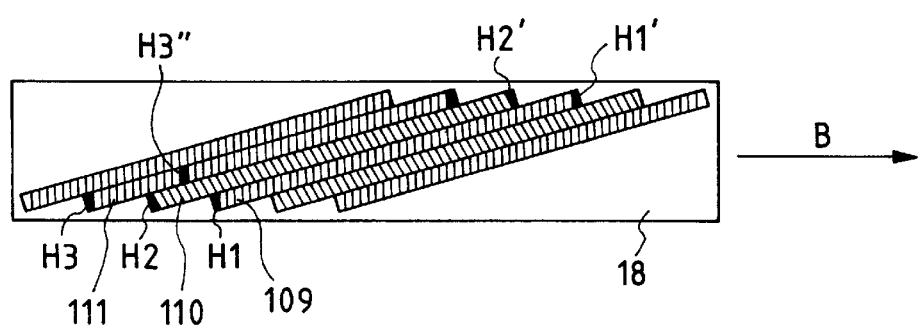
FIG. 23 is a typical view of a recording pattern in which information is recorded by an information recording apparatus to be used by the present invention.

FIG. 23 shows signals recorded on the tape 18 which are reproduced with the heads 104 and 105. The heads 104 and 105 may be used for recording signals. The tape 18 travels in the direction of the arrow B (FIG. 23). Referring to FIG. 23, first, the head 104 scans a track 109 from a position H1 to a position H1'. Simultaneously with or after the separation of the head 104 from the tape 18 after arriving at the position H1', the head 105 starts scanning a track 110 contiguous with the track 109 from a position H2. Simultaneously with or after the separation of the head 105 from the tape 18 after arriving at a position H2', the head 104 starts scanning a track 111 contiguous with the track 110 from a position H3. The series of those scanning operations is repeated to reproduce the signals.

The head 101 disposed on the rotary drum 27, as shown in FIGS. 20 to 22, starts scanning the track 110 from the position H2 upon the arrival of the head 104, which has started scanning the track 111 from the position H3 at a position H3". The track 110 has been scanned and signals recorded on the track 110 have been reproduced with the head 105 before the head 104 scans the track 111. If the head 101 creates a magnetic field capable of erasing signals recorded on the track 110, the signals recorded on the track 110 are erased when the track 110 is scanned with the head 101. If the head 101 records on the track 110 signals different from those previously recorded on the track 110 in a replace mode, signals different from those previously recorded on the track 110 are recorded on the track 110 when the track 110 is scanned with the head 101. The series of those scanning operations is repeated to erase or to disable the reproduction of the signals recorded on tracks scanned with the head 105 for reproduction. If the gap width of the head 101 shown in FIG. 22 is increased downward to a width twice the gap width of the head 104 or 105 or above, the head 101 is able to erase or to disable the reproduction of the signals recorded on tracks scanned with the head 104 as well as the signals recorded on tracks scanned with the head 105.

Although the recording medium is a tape in this embodiment, the recording medium may be a semiconductor storage device, a disk or the like.

Figure 24A:
FIGS. 24(a), 24(b) and 24(c) are timing charts for use in explaining a signal processing method to be carried out by an information recording apparatus to be used by the present invention.
Figure 24B:
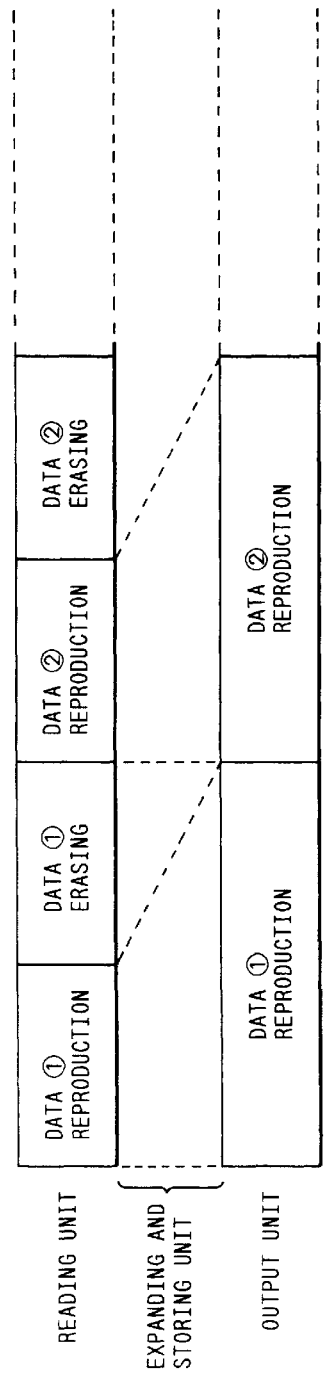
Figure 24C:
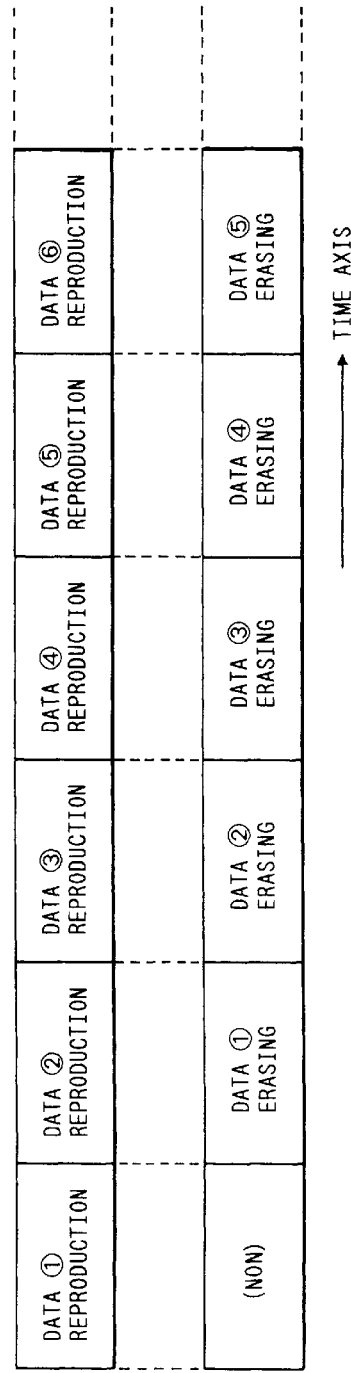

If a semiconductor storage device is employed as the recording medium and the semiconductor storage device has a single I/O terminal, reproducing periods and erasing periods are used in a time-division system, and information reproduced in a reproducing period may be erased in a subsequent erasing period, as shown in FIG. 24(a). In a system for processing signals which must be continuous, such as video signals, the signals are recorded in a time-base compressing system, and the reproduced signals are expanded in a time-base expanding system, as shown in FIG. 24(b), the reproduced signals are stored temporarily in a buffer memory or the like, and the stored signals are provided continuously so that signals are not missing in erasing periods. If the semiconductor storage device has a plurality of I/O terminals, some of the I/O terminals may be used exclusively for reproducing and the rest may be used exclusively for erasing. A specific address of the semiconductor storage device is assigned to the allowable number of reproducing cycles, and a specific address is assigned to the decision of the erasing function. The specific address assigned to the decision of the erasing function may be kept blank.

When a disk is employed as a recording medium and the recording device is provided with a single head, the head is shifted radially after scanning each track twice to reproduce signals in the first scanning cycle and to erase the signals in the second scanning cycle. If the signals must be continuous, the signals may be processed by the same procedure as the aforesaid procedure used for processing the signals stored in the semiconductor storage device. If the recording device is provided with a plurality of heads, some of the plurality of heads may be used exclusively for reproducing and the rest may be used exclusively for erasing, which is the same practice as that taken for reproducing and erasing signals recorded in the semiconductor storage device. The reproducing cycle limiting information may be recorded on specified tracks, a specific track may be assigned to the decision of the erasing function and may be kept blank.

The embodiments and the modifications described above may be used in combination.

The present invention is capable of controlling operations for reproducing information provided by an information provider, as well as operations for recording the information, of limiting the repetition of the reproducing cycle to a specified number of reproducing cycles and of achieving reliable management of the information provided by the information provider.

What is claimed is:

1. An information management apparatus having a transmitter which transmits information including main information and control information to a receiver which receives said main and control information, said main information being a video program, said receiver comprising:

recording means for recording said main information received from said transmitter along a length of a recording medium, said recording medium being a tape, and recording said control information received from said transmitter along a length of said recording medium except at the beginning and end points of said recording medium;

main information reproducing means for reproducing said main information recorded on said recording medium;

reproduction management means for reproducing said control information recorded on said recording medium and managing operation of said main information reproducing means such that said main information reproducing means reproduces said main information based on said control information, said control information including allowable condition information representing conditions under which reproduction of said main information is allowable and execution process information for indicating a number of executed reproducing cycles; and reproduction disabling means, included in said reproduction management means, for disabling said main information reproducing means based on a comparison between said allowable condition information and execution process information, said reproduction disabling means including reproduction start refusing means for refusing a reproduction of said main information based on said comparison.

2. An information management apparatus according to claim 1, wherein the reproduction managing means comprises a disable control means for controlling the disabling operation of the reproduction disabling means, and a control information recording means for storing and reproducing control information for the control operation of the disable control means.

3. An information management apparatus according to claim 2, wherein the control information recorded on the control information recording means includes accounting information for counting the usage charge for main information reproduction by the main information reproducing means.

4. An information management apparatus according to claim 2, wherein the control information is recorded in the control information recording means near a position where an operation for recording the main information in the recording medium and/or an operation for reproducing the main information is started and/or terminated.

5. An information management apparatus according to claim 2, wherein the control information recorded in the control information recording means is recorded in the recording medium in which the main information is recorded.

6. An information management apparatus according to claim 2, wherein the control information recorded in the control information recording means is recorded in a second recording medium integrally combined with the recording medium recording the main information.

7. An information management apparatus according to claim 2, wherein the control information recorded in the control information recording means is recorded and reproduced with the reproducing head of the main information reproducing means.

8. An information management apparatus according to claim 1, wherein the reproduction disabling means disables a reproduced portion of the main information while the main information reproducing means is in operation for reproducing the main information, and further is provided with reproduction start refusing means.

9. An information management apparatus according to claim 1, wherein the reproduction disabling means inhibits a backward change of the reproducing position in the main information by the main information reproducing means, and further is provided with reproduction start refusing means.

10. An information management apparatus according to claim 1, wherein the reproduction disabling means is provided with a main information degrading means, for degrading at least a portion of the main information, and reproduction start refusing means.

11. The information management apparatus recited in claim 1, wherein said control information is recorded at first and second positions which substantially correspond to start and end positions on said recording medium.

12. The information management apparatus recited in claim 1, wherein said execution process information is recorded on a regularly spaced, predetermined number of tracks on said recording medium.

13. The information management apparatus recited in claim 1, wherein said execution process information is recorded on every track of said recording medium.

14. The information management apparatus recited in claim 1, wherein said control information is recorded on tracks of said recording medium on which said main information is recorded, said control information being recorded on said tracks in such a manner so that said control information resides independently from main information.

15. The information management apparatus recited in claim 1, wherein said control information is recorded for every reproducing time.

16. The information management apparatus recited in claim 15, wherein said control information is recorded in a replace mode.

17. A receiver for use in an information management apparatus having a transmitter which transmits information including main information and control information to said receiver which receives said main and control information, said main information being a video program, said receiver comprising:

a recording circuit which records said main information received from said transmitter along a length of a recording medium, said recording medium being a tape, and records said control information received from said transmitter along a length of said recording medium except at the beginning and end points of said recording medium;

a main information reproducing circuit which reproduces said main information recorded on said recording medium;

a reproduction management circuit which reproduces said control information recorded on said recording medium and manages operation of said main information reproducing circuit such that said main information reproducing circuit reproduces said main information based on said control information, said control information including allowable condition information representing conditions under which reproduction of said main information is allowable and execution process information for indicating a number of executed reproducing cycles; and a reproduction disabling circuit, included in said reproduction management circuit, for disabling said main information reproducing circuit based on a comparison between said allowable condition information and execution process information, said reproduction disabling circuit including a reproduction start refusing circuit which refuses a reproduction of said main information based on said comparison.

* * * * *